United States Patent
Kinio et al.

(10) Patent No.: US 12,291,250 B2
(45) Date of Patent: May 6, 2025

(54) PORTABLE POSITIONING AND ODOMETRY SYSTEM

(71) Applicant: Hitachi Rail GTS Canada Inc., Toronto (CA)

(72) Inventors: Walter Kinio, Toronto (CA); Rudy Rochefort, Toronto (CA); Alon Green, Toronto (CA)

(73) Assignee: Hitachi Rail GTS Canada Inc., Toronto (CA)

( * ) Notice: Subject to any disclaimer, the term of this patent is extended or adjusted under 35 U.S.C. 154(b) by 635 days.

(21) Appl. No.: 17/073,172

(22) Filed: Oct. 16, 2020

(65) Prior Publication Data

US 2021/0114639 A1    Apr. 22, 2021

Related U.S. Application Data

(60) Provisional application No. 62/916,715, filed on Oct. 17, 2019.

(51) Int. Cl.
*B61L 25/02* (2006.01)
*B61L 27/04* (2006.01)
(Continued)

(52) U.S. Cl.
CPC ........... *B61L 25/025* (2013.01); *B61L 25/026* (2013.01); *B61L 27/04* (2013.01); *G01S 13/86* (2013.01);
(Continued)

(58) Field of Classification Search
CPC ...... B61L 25/025; B61L 25/026; B61L 27/04; B61L 2027/204; B61L 2202/00;
(Continued)

(56) References Cited

U.S. PATENT DOCUMENTS 4,876,597 A * 10/1989 Roy ...................... B61L 25/041
                                                  375/E7.206
7,725,252 B2   5/2010 Heddebaut et al.
(Continued)

FOREIGN PATENT DOCUMENTS

CN    104833354 A  *  8/2015
CN    109484435 A  *  3/2019  ............ B61L 25/026
(Continued)

OTHER PUBLICATIONS

Quist et al., Eric, "Radar Odometry on Fixed-Wing Small Unmanned Aircraft," IEEE Transactions on Aerospace and Electronic Systems, vol. 52, No. 1, pp. 396-410, Feb. 2016, DOI: 10.1109/TAES.2015.140186.
(Continued)

*Primary Examiner* — Zachary L Kuhfuss
*Assistant Examiner* — James William Jones
(74) *Attorney, Agent, or Firm* — Studebaker Brackett PLLC

(57) ABSTRACT

A positioning and odometry system (POS) includes one or more sensors configured to collect sensor data. The one or more sensors are operably coupled to a portable housing configured to be coupled to a vehicle body. POS has processing circuitry operably coupled to the one or more sensors. The processing circuitry is configured to determine, in response to the collected sensor data from the one or more sensors, vehicle position and odometry data.

20 Claims, 12 Drawing Sheets

(51) Int. Cl.
G01S 13/86 (2006.01)
G01S 17/86 (2020.01)
H04B 1/00 (2006.01)
B61L 27/20 (2022.01)
G01S 13/931 (2020.01)

(52) U.S. Cl.
CPC .............. *G01S 17/86* (2020.01); *H04B 1/005* (2013.01); *B61L 25/021* (2013.01); *B61L 2027/204* (2022.01); *B61L 2201/00* (2013.01); *G01S 2013/9328* (2013.01)

(58) Field of Classification Search
CPC .. G01S 2013/9328; G01S 13/86; G01S 17/86; H04B 1/005
See application file for complete search history.

(56) References Cited

U.S. PATENT DOCUMENTS

| | | | |
|---|---|---|---|
| 7,962,285 B2 | 6/2011 | Breed | |
| 8,214,091 B2 | 7/2012 | Kernwein | |
| 8,296,065 B2 | 10/2012 | Haynie et al. | |
| 8,812,227 B2 | 8/2014 | Carlson et al. | |
| 9,250,083 B2 | 2/2016 | Czompo et al. | |
| 9,810,533 B2* | 11/2017 | Fosburgh | B61L 23/041 |
| 10,152,336 B2 | 12/2018 | Kohlenberg et al. | |
| 10,179,595 B2 | 1/2019 | Carlson et al. | |
| 10,297,153 B2 | 5/2019 | Gao et al. | |
| 10,365,363 B2 | 7/2019 | Rohr et al. | |
| 10,809,374 B2* | 10/2020 | Wetoschkin | G01S 13/931 |
| 11,340,354 B2* | 5/2022 | Lin | G01S 13/867 |
| 2005/0125113 A1 | 6/2005 | Wheeler et al. | |
| 2010/0066587 A1 | 3/2010 | Yamauchi et al. | |
| 2010/0131129 A1 | 5/2010 | Daum et al. | |
| 2015/0166085 A1* | 6/2015 | Mongaya | B61L 23/34 246/2 S |
| 2017/0023659 A1* | 1/2017 | Bruemmer | G01S 5/0278 |
| 2018/0164798 A1 | 6/2018 | Poeppel et al. | |
| 2018/0356492 A1 | 12/2018 | Hamilton | |
| 2019/0071106 A1* | 3/2019 | Carlson | B61L 27/70 |
| 2019/0100226 A1* | 4/2019 | Baier | B61L 27/04 |
| 2019/0146520 A1* | 5/2019 | Naithani | B60W 30/18009 701/28 |
| 2019/0250615 A1 | 8/2019 | Gillett | |
| 2019/0263432 A1* | 8/2019 | Carlson | H04W 4/42 |
| 2019/0361114 A1* | 11/2019 | Kim | G01S 13/42 |
| 2021/0094595 A1* | 4/2021 | Kälberer | B61L 25/025 |

FOREIGN PATENT DOCUMENTS

| | | |
|---|---|---|
| DE | 102017205962 A1 | 10/2018 |
| EP | 1942041 A2 | 7/2008 |
| EP | 3138754 A1 | 3/2017 |
| JP | 5501101 B2 * | 5/2014 |
| WO | 2009139927 A2 | 11/2009 |
| WO | 2016139580 A1 | 9/2016 |
| WO | WO-2018134535 A1 * | 7/2018 ............ B61L 15/009 |
| WO | WO-2018158711 A1 * | 9/2018 .......... B61L 15/0054 |
| WO | 2019043446 A1 | 3/2019 |

OTHER PUBLICATIONS

Fresk et al., Emil, "Ultra Wideband Enabled Inertial Odometry for Generic Localization," IFAC-PapersOnLine 50.1 (2017): 11465-11472.

Extended European Search Report issued in corresponding European Application No. 20876285.6, dated Oct. 30, 2023, European Patent Office, Munich, Germany.

* cited by examiner

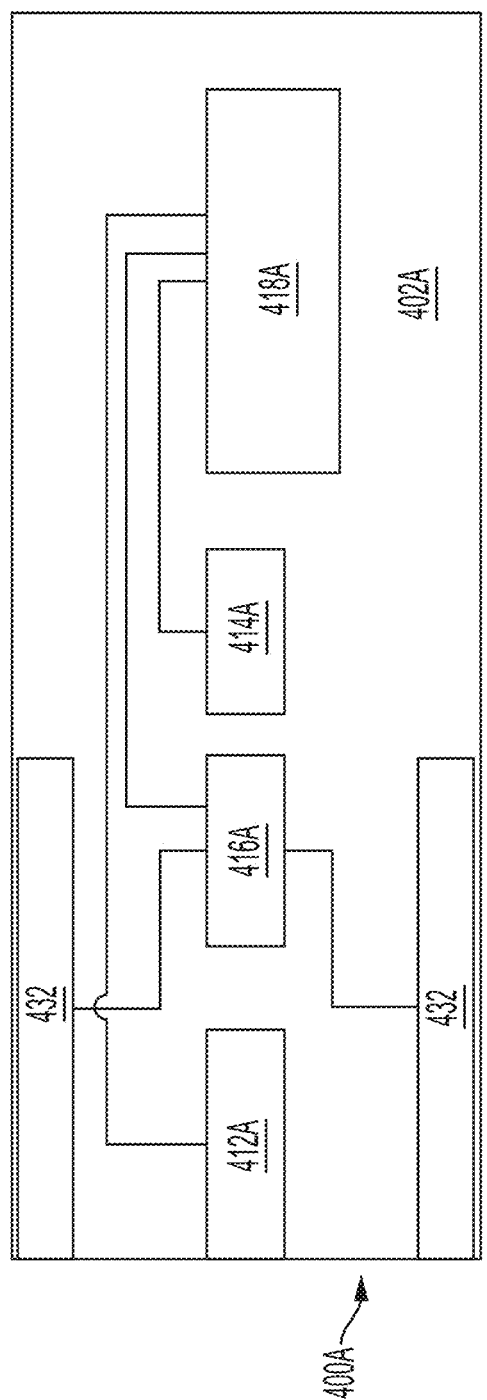

PORTABLE POSITIONING AND ODOMETRY SYSTEM

RELATED APPLICATIONS

The following application claims priority to U.S. provisional patent application No. 62/916,715 filed on Oct. 17, 2019, titled "Portable Positioning and Odometry System" and is hereby incorporated by reference in its entirety.

The following references are relevant to this disclosure and are hereby incorporated by reference herein in their entireties: WO2018158711, WO2018158712, Canadian Patent CA2977730 "Guideway Mounted Vehicle Localization System," U.S. application Ser. No. 16/143,035 and published as U.S. 2019/0092360 entitled "Guideway Mounted Vehicle Localization and Alignment System and Method," U.S. application Ser. No. 16/430,194 and published as U.S. 20190370638 entitled "System For and Method of Data Encoding and/or Decoding Using Neural Networks," U.S. application Ser. No. 16/577,315 and published as U.S. 20200096362 entitled "Stationary State Determination Speed Measurements," U.S. Application No. 62/779,949 entitled "Vehicle Odometry and Motion Direction Determination Using COTS Radar," U.S. Application No. 62/779,969 entitled "Obstacle Avoidance and Remote Localization Method for Railway Vehicle Using Range Measurement Beacon Array," U.S. Application No. 62/782,077 entitled "Grade and Acceleration Due to Motoring and Breaking Determination," U.S. Application No. 62/901,989 entitled "Method and System for High-Integrity Vehicle Localization and Speed Determination."

BACKGROUND

The positioning and speed of a rail vehicle can be determined by a system comprised of a checked-redundant vehicle onboard controller (VOBC) computer connected to a set of sensors. The VOBC is typically packaged in a sub-rack measuring 3 U or 6 U (13.3 cm to 26.7 cm) in height. The sensors can consist of a radio frequency identification (RFID) tag reader, a tachometer/speed sensor and accelerometer with RFID tags installed along the guideway. The speed and positioning functions are typically part of the VOBC and are not deployed as a stand-alone capability.

Some rail vehicles, such as maintenance vehicles, have limited space to install a communication-based train control (CBTC) system equipment including a VOBC computer. In some CBTC systems, it is difficult to install the traditional speed sensors or tachometers on the maintenance vehicles. Hall Effect sensors and tachometers are commonly installed on a bogie and the installation is constrained by maintenance pit scheduling and is time and labor intensive. In some circumstances, the maintenance vehicles are of variable length (i.e., due to the addition of a varying number of cars). Some maintenance vehicles are rarely deployed in a CBTC territory since they don't have a speed and positioning computer in a CBTC system and it is very difficult for the CBTC system to track and locate the maintenance vehicles for the safety of all vehicles in the CBTC system.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4A is a top view block diagram of a vehicle with an example SIL 0/2 PPOS, in accordance with some embodiments.

DETAILED DESCRIPTION

Figure 1:
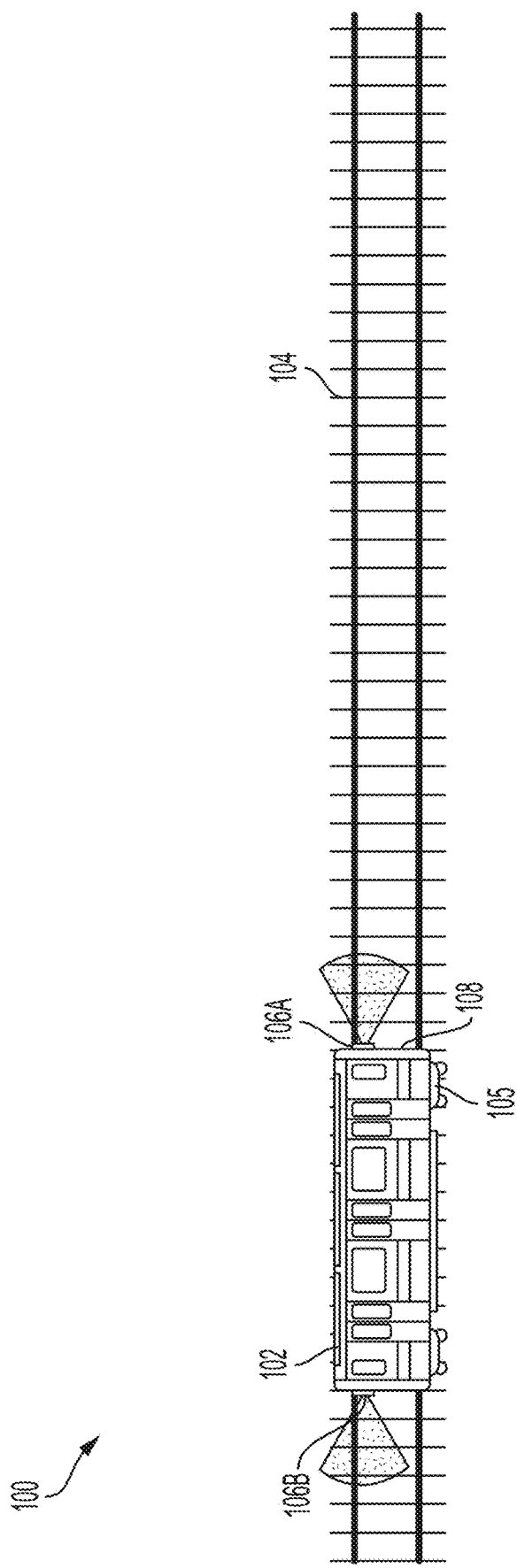
FIG. 1 is a top-level diagram of an example portable positioning and odometry system (PPOS), in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In examples of the disclosure, the positioning and speed determination functions are separated from the VOBC providing a portable, smaller in size (i.e., than a traditional VOBC system), easier to install positioning and speed determination system for rail vehicles, in at least some embodiments.

In some embodiments, the migration to CBTC technology requires the full fitment of VOBC equipment onto trains prior to the rollout of the CBTC system. In some embodiments, the ability to deploy a 'light-weight' positioning and speed determination unit supports a more flexible migration strategy. Further, this light-weight positioning and speed determination unit is used for vehicles other than train vehicles in some embodiments. Also, the suggested approach in the examples of the disclosure provide an ability to deploy a full fitment of a VOBC system onto a vehicle with a significant reduction in time, labor and vehicle space requirements in comparison with other approaches.

In examples discussed in the disclosure, maintenance vehicles or other smaller vehicles do not need to accommodate a fully implemented VOBC with a complete sensor set to determine the vehicle's position and speed. Examples of the present disclosure discuss a minimal deployment option to support an incremental migration strategy.

Outfitting a maintenance vehicle to accommodate a fully implemented VOBC is expensive, time consuming and can result in performance issues, as well. Maintenance vehicles or other rail vehicles with equipment installation space constraints simply cannot fit a CBTC traditional, fully implemented, VOBC on-board controller including its associated sensors set.

FIG. 1 is a top-level diagram of an example portable positioning and odometry system (PPOS) 100, such as a next generation positioning system (NGPS), in accordance with some embodiments. A vehicle 102, such as a maintenance vehicle, operates on a specially prepared surface for vehicle 102, such as track 104 that may or may not be within a CBTC system. Vehicle 102 has a sensor housing 106A coupled to vehicle body 108. An optional sensor housing 106B is placed at the end of a train body 108 or at the end of the very last vehicle if there are multiple vehicles coupled to one another or if the length of the vehicle needs to be known. Sensor housings 106A and 106B (hereinafter sensor housing 106) structurally support one or more sensors that determine speed data separate from a VOBC and without coupling to a vehicle bogie 105. Sensor housing 106 includes a minimum amount of sensors (e.g., one or more) that accurately determine a speed of vehicle 102. One or more sensors (not shown), such as an inertial measurements unit (IMU), a multiple-input multiple-output (MIMO) radio detection and ranging (radar) with antenna or multiple antennas, or an ultra-wideband radio with one or more antenna, are housed in sensor housing 106 and are easily installed or coupled to vehicle body 108, in at least some embodiments.

A processor housing, not shown, is located on vehicle 102 for use by a user on vehicle 102 or communicated with a user via a radio (not shown) within the processor housing by an "off-train" computer system, such as a CBTC system. The processor housing houses the processing circuitry (not shown) and interfaces (not shown) used to couple components within the processor housing to sensor housing 106. The processor housing also includes a memory (not shown) for storing algorithms and instructions for positioning and odometry data. In at least some embodiments, the processing circuitry has a modular architecture to support the upgrading of additional modules and functions for vehicle 102. For example in some embodiments, when a vehicle, such as vehicle 102, is introduced to a CBTC system, it is desirable to first test the accuracy of the speed data originating from the sensors as well as the positioning data determined by the processing circuitry. After determining that the sensors are providing accurate data and the processing circuitry is processing the sensor data acceptably in a testing phase, other modules are implemented to provide additional functionality. Additional hardware is added, such as speed and positional sensors, including a camera and light detection and ranging (LiDAR). Additional functionality is added through software or hardware or a combination of software and hardware to allow for automatic train protection (ATP) and automatic train operation (ATO) in at least some embodiments. Adding additional modules allows for vehicle 102 to be fully implemented as a VOBC into a CBTC system through the use of a smaller and lighter weight PPOS 100, in at least some embodiments.

In at least some embodiments, PPOS system 100 incorporates NGPS technology running on a dedicated, scalable platform. PPOS 100 is deployed independently of a full VOBC system, which is required for all CBTC functions in some embodiments. In at least some embodiments, PPOS 100 provides positioning and odometry as a basic element of capability, along with the ability to communicate to other "off-train" systems (e.g., such as wayside CBTC controllers, other "on-train" positioning platforms, or other trains). In at least some embodiments, PPOS 100 is expanded or upgraded to include other functionality such as train length determination as discussed in greater detail below. If PPOS 100 is equipped with a basic train interface, such as a safety integrity level (SIL) 4 emergency brake interface (not shown), PPOS 100 is also used to support ATP functions such as over-speed protection. SIL 4 is based, in one example, on International Electrotechnical Commission (IEC) standard IEC 61508 and EN 50126 and EN50129 standards. Thus, a SIL 4 represents that the failure probability per hour is in the range of $10^{-8}$ to $10^{-9}$; making PPOS 300 very reliable. In at least some embodiments, a SIL 4 PPOS 300 is used where safety is critical and required.

In examples of the detailed description, PPOS 100 is upgraded from a SIL 0/2 of basic functionality, as described with reference to FIG. 2, to provide full VOBC functionality. A SIL 0/2 represents that the failure probability per hour is in the range of $10^{-4}$ to $10^{-7}$; that is reliable, but not as reliable as SIL 4 where safety is critical and required.

Figure 2:
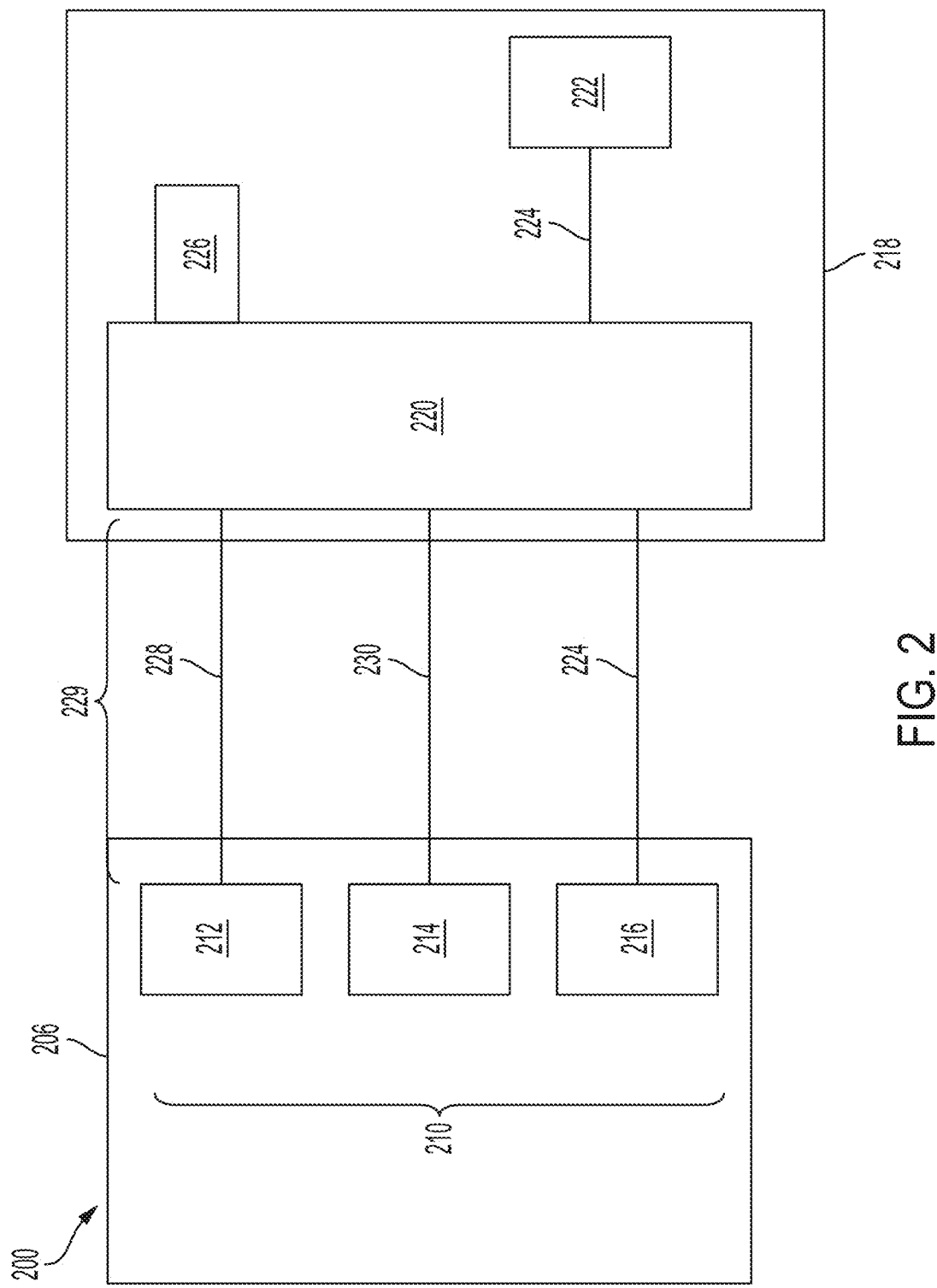
FIG. 2 is a high-level functional block diagram of an example PPOS, in accordance with some embodiments.

FIG. 2 is a high-level functional block diagram of an example portable positioning and odometry system 200, in accordance with some embodiments. PPOS 200 is comparable to PPOS 100 both structurally and operationally or PPOS 200 is structurally and operationally different from PPOS 100. In at least some embodiments, PPOS 200 is also used on a vehicle such as vehicle 102 (FIG. 1). PPOS 200 has a sensor housing 206 that is comparable to sensor housing 106. PPOS 200 has one or more sensors 210 that collect sensor data. Sensors 210 is operably coupled to portable housing 206 such that portable housing 206 protects and isolates sensors 210 from damage or interference. Portable housing 206 is coupled to a vehicle body, such as vehicle body 108. Processing circuitry 220 is operably coupled to sensors 210 through interfaces 229. Processing circuitry 220 determines, in response to collected sensor data from sensors 210, vehicle position and odometry data.

Sensor housing 206 is made from a material that is light weight and sturdy enough to protect sensors 210. In at least some embodiments, sensor housing is constructed of aluminum, wood, carbon-reinforced nylon, Kevlar-reinforced nylon, fiberglass-reinforced nylon, high specific strength steel, or the like as long as the material is sturdy enough to protect sensors 210 while coupled to a vehicle body during travel and light weight enough to make for easy attachment of sensor housing 206 to a vehicle body by a user.

A minimum sensor set includes one or more of an ultra-wideband (UWB) radio with one or more antenna 212, a MIMO radar with antenna or multiple antennas 214, and an IMU 216 that provide 3-D acceleration and angular rate data to processing circuitry 220 for positioning and odometry functions. UWB 212 utilizes any radio technology that uses a very low energy level for short-range, high-bandwidth communications over a dedicated portion of the radio spectrum (typically 2 GHz to 10 GHz) in at least some embodiments. In some embodiments, UWB 212 is used for target sensor data collection, precision locating and tracking applications. IMU 216 utilizes accelerometers, gyroscopes, magnetometers, or any combination of these devices to measure a vehicle's acceleration, angular rate and heading in some embodiments. In some embodiments, radar 214 utilizes Doppler radar, pulsed radar or continuous-wave radar to determine distance to an object and the change in distance over time to determine speed. In some embodiments radar 214 is Doppler radar capable to determine the vehicle speed based on the Doppler shift. Radar 214 has a MEMO antenna allowing for the capacity of a radio link using multiple transmission and receiving antennas to exploit multipath propagation in some embodiments.

In at least some embodiments, sensor housing 206 is easily coupled to the vehicle body by a user or operator. There is no need to mount sensor housing 206 to the vehicle bogie, wheel, or axle in order to determine revolutions. Therefore, sensor housing 206 is easier to install than other sensors, such as a tachometer, speed sensor and RFID tag reader that are bogie, wheel, or axle mounted. In at least some embodiments, sensors 210 is packaged in sensor housing 206 and mounted on the vehicle's body resulting in short installation time. In at least some embodiments, sensor housing 206 is mounted using most any reliable coupler, fastener, or other attachment mechanisms such as suction cups, brackets, magnets, adhesives, or the like. The coupling of sensor housing 206 to the vehicle body does not require access to a maintenance pit since sensor housing 206 is vehicle body mounted and not bogie, wheel or axle mounted. Installations that require a maintenance pit are difficult to arrange because there are very few maintenance pits and most are occupied for maintenance action based on predefined schedule.

In at least some embodiments, processor housing 218 is placed most anywhere on the vehicle, such as vehicle 102. In at least some embodiments, processor housing 218 is most any lightweight and sturdy material such as sensor housing 206. In at least some embodiments, the material of processor housing 218 is most any sturdy and light weight material such as aluminum, wood, polymers, carbon-reinforced nylon, Kevlar-reinforced nylon, fiberglass-reinforced nylon, high specific strength steel, or the like. In at least some embodiments, processor housing 218 is placed in an area occupied by a user of PPOS 200 or even carried by an operator of PPOS 200 (i.e., if an operator is necessary as PPOS 200 can operate without a user in at least some embodiments). Processor housing 218 contains processing circuitry 220, a radio 222 coupled to processing circuitry 220 through an Ethernet bus 224 and an ID plug 226 to provide a unique ID in at least some embodiments.

Sensors 210 include several interfaces 229 to communicate with processing circuitry 220, such as controller area network (CAN) bus 228, a serial bus 230 and Ethernet 224, to support sensors 210. In at least some embodiments, processing circuitry 220, has either a single central processing unit/micro controller unit (CPU)/(MCU) or two CPUs/MCUs in checked redundant configuration, including interfaces 229 to sensors 210. In at least some embodiments, processing circuitry 220 is a processor or processing unit that performs operations on some external data source, such as sensors 210, or on algorithms or functions stored in memory. In at least some embodiments, interfaces 229 include power delivery to drive sensors 210, such as +12 VDC or power over Ethernet (POE) if the interface is Ethernet 224. In at least some embodiments, processing circuitry 220 includes identification plug 226 that provides a unique ID for PPOS 200 and an additional Ethernet port to interface with radio 222. In at least some embodiments, radio 222 is most any type of radio performing radio communication on a designated frequency. In at least some embodiments, processing circuitry 220 includes DC-DC converters, such as +140 VDC to +15 VDC, to transform the vehicle's battery voltage level into lower voltage level, typically +12 VDC.

In at least some embodiments, processing circuitry 220 includes a graphical processing unit (GPU) to support processing of camera and LiDAR sensors that is added or upgraded at later times. Processing circuitry 220 and its interfaces 229 meet the input-output, input-chassis and output-chassis isolation requirements, typically 2000 VDC in at least some embodiments. If processing circuitry 220 contains multiple processors in checked redundant configuration, the multiple processors are isolated from one another in at least some embodiments.

In at least some embodiments, PPOS 200 represents a safety integrity level 0 or 2 (SIL 0/2) configuration for use in a non-safety critical level of integrity. For example, during the deployment of PPOS 200, post installation check out (PICO) and system verification tests is performed where the safety properties of PPOS 200 is ensured in at least some embodiments. In other examples, a non-safety critical level of integrity SIL 0/2 is upgraded after successful testing to a safety critical level of integrity (SIL 4).

In one example, the difference between SIL 0/2/4 systems is the minimum number of sensors contained in the system. With reference to table 1 below.

TABLE 1

| Sensor | SIL 0/2 | SIL 4 |
| --- | --- | --- |
| UWB | x1 with two antennas | x2 with two antennas |
| Radar | x1 | x2 (checked redundant) |
| IMU | x1 | x2 (checked redundant) |

In at least some embodiments, deployment of SIL 0/2 PPOS is performed to collect sensor measurements and to verify that the positioning and odometry functions are working reliably and accurately during the PICO tests and until formal commissioning tests begin. In at least some embodiments, the initial deployment of a SIL 0/2 PPOS, such as PPOS 200, is to build system confidence by using a vehicle by vehicle and a zone by zone approach in the positioning and odometry functions maturity while safety is ensured.

In an example where reference LiDAR survey data is not yet available for PPOS 200 or for a certain section of track, such as track 104 (FIG. 1), PPOS 200 uses measurements from multiple, already deployed PPOSs, either installed on the same vehicle or installed on multiple vehicles. In at least some embodiments, these multiple measurements are combined to generate a guideway map (e.g., a map used to illustrate routes and stations within a system). In at least some embodiments, the guideway map then provides position information when LiDAR survey data is not yet available.

In at least some embodiments, the amalgamation of measurements from multiple PPOSs is performed offline in a local office or in remote location. The measurements are offloaded from the vehicle or vehicles either manually or by using wireless communications technology connecting the vehicle or vehicles to the local office in at least some embodiments. The amalgamation of measurements from multiple PPOSs is performed onboard one or multiple vehicles if the measurements are transmitted wirelessly between vehicles in at least some embodiments. In at least some embodiments, fusion between sensor measurements techniques are used to build or update a guideway map and check the consistency between measurements taken by different PPOS.

In at least some embodiments, when all PICO testing is complete and PPOS 200 is found to be reliable and accurate, PPOS 200 is upgraded from a SIL 0/2 to a SIL 4. The differences between the two SILs may be seen with the discussion of FIG. 3.

Figure 3:
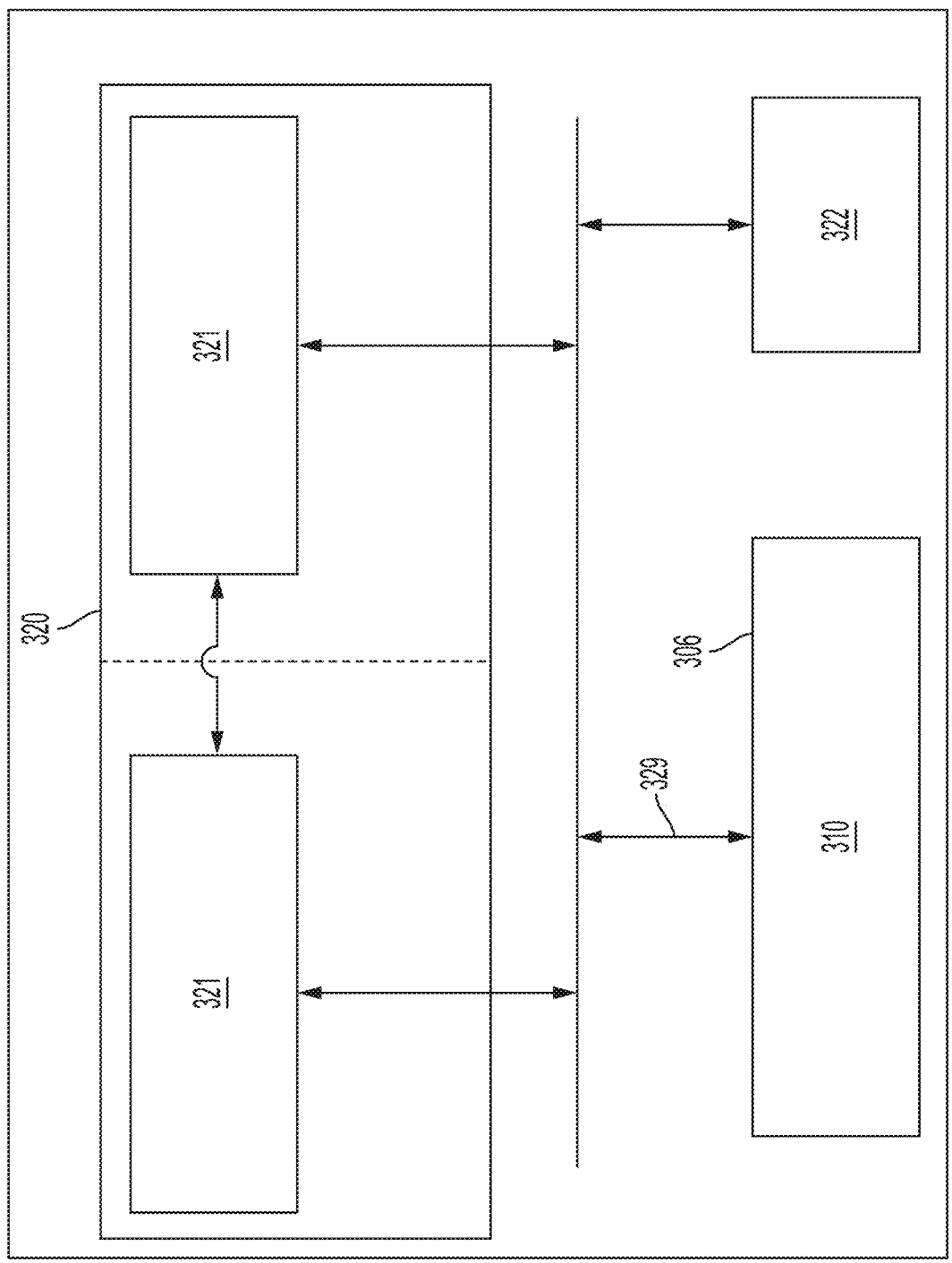
FIG. 3 is a high-level functional block diagram of an example safety integrity level (SIL) 4 PPOS, in accordance with some embodiments.

FIG. 3 is a high-level functional block diagram of an example SIL 4 PPOS 300, in accordance with some embodiments. PPOS 300 is comparable to PPOS 100 both structurally and operationally or PPOS 300 is structurally and operationally different from PPOS 100. PPOS 300 is used on a vehicle such as vehicle 102 (FIG. 1). PPOS 300 has a sensor housing 306 that is comparable to sensor housing 106 and 206. PPOS 300 has one or more sensors 310 that collect sensor data. Sensors 310 is operably coupled to portable housing 306 such that portable housing 306 protects and isolate sensors 310 from damage or interference. Portable housing 306 is coupled to a vehicle body, such as vehicle body 108. Processing circuitry 320 is operably coupled to sensors 310 through interfaces 329. Processing circuitry 320 determines, in response to collected sensor data from sensors 310, vehicle position and odometry data.

In at least some embodiments, PPOS 300 has a sensor set 310, a radio 322, and processing circuitry 320 having two processors or microcontrollers 321. As shown in Table 1 above, SIL 4 PPOS 300 has two UWB antennas comparable to the SIL 0/2 PPOS 200 in at least some embodiments. SIL 4 PPOS 300 has two radars each with MIMO antennas and two IMUs in at least some embodiments.

SIL 4 is based, in one example, on International Electrotechnical Commission (IEC) standard IEC 61508 and EN 50126 and EN 50129 standards. Thus a SIL 4 represents that the failure probability per hour is in the range of $10^{-8}$ to $10^{-9}$; making PPOS 300 very reliable. A SIL 4 PPOS 300 is used where safety is critical and required in at least some embodiments.

In at least some embodiments, when testing of a SIL 0/2 PPOS, such as PPOS 200, is completed, PPOS 200 is upgraded into a SIL 4 PPOS, such as PPOS 300. The upgrade consists of software (S/W) updates if PPOS hardware (H/W) is already suitable for a SIL 4 application in at least some embodiments. If the hardware is not suitable for a SIL 4 application, then an upgrade consists of both S/W and H/W updates, such as swapping out a sensor housing, a processor housing, interfaces with train propulsion or operation features, or all of these features in at least some embodiments.

Comparable to PPOS 200, PPOS 300 is upgradable to add basic ATP functions such as over speed supervision, movement authority determination and supervision, or the like in at least some embodiments. Radio 322 serves as an interface with trackside units and a database is updated to contain speed limits, braking rates and other parameters as necessary to accomplish these functions in at least some embodiments.

In at least some embodiments, PPOS 300 is upgraded to interface with a user either on-board the host vehicle or in a central control office. The interface provides speed profiles, vehicle location and speed information for display and/or tracking purposes in at least some embodiments. The physical differences between a SIL 0/2 and SIL 4 PPOS are discussed in FIGS. 4A and 4B.

Figure 4B:
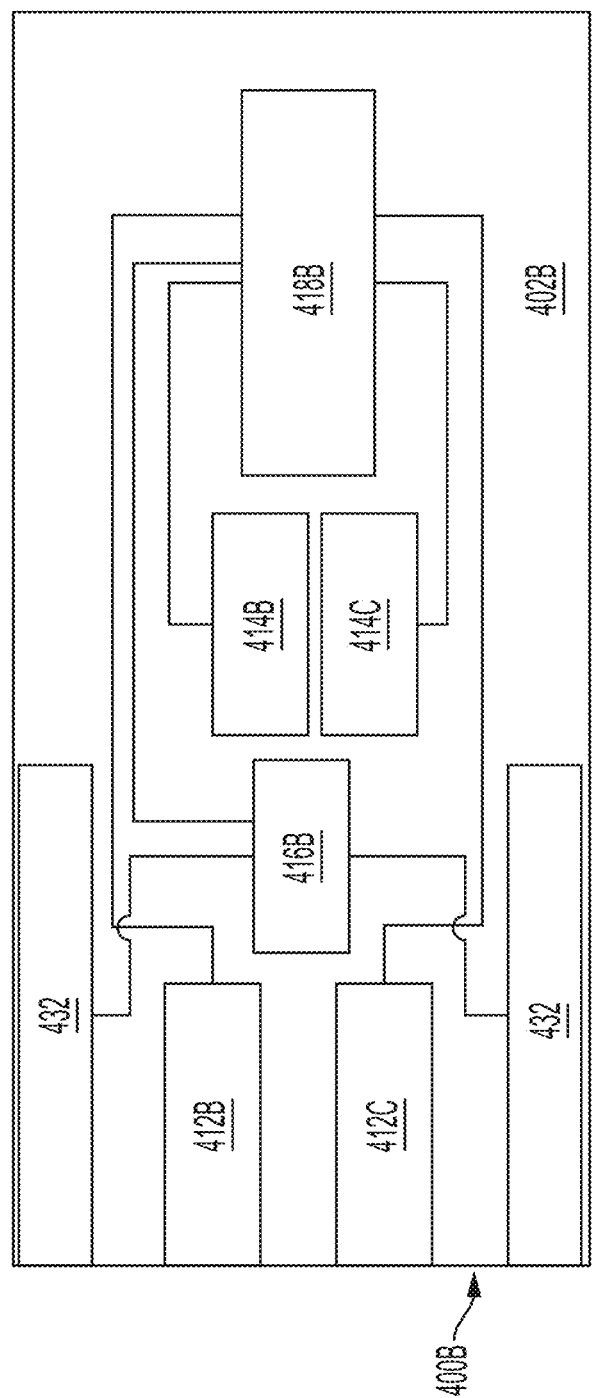
FIG. 4B is a top view block diagram of a vehicle with an example SIL 4 PPOS, in accordance with some embodiments.

FIG. 4A and FIG. 4B are top view block diagrams of vehicles 402A & 402B with an example SIL 0/2 PPOS 400A and an example SIL 4 PPOS 400B, in accordance with some embodiments. Vehicles 402A and 402B are similar to vehicle 102 and are shown in FIGS. 4A and 4B as being viewed from overhead.

In FIG. 4A and with reference to Table 1 above, SIL 0/2 PPOS 400A have a processor housing 418A, an IMU 414A, a radar with MIMO antenna 412A, a UWB radio 416A and two UWB antennas 432. PPOS 400A is comparable to PPOS 200 both structurally and operationally or PPOS 400A is structurally and operationally different from PPOS 200. PPOS 400A has a sensor housing that is comparable to sensor housing 206.

In at least some embodiments, where the safety critical level of integrity is low a SIL 0/2 PPOS, such as PPOS 400A, is implemented with minimal speed sensors used to collect speed data for position and odometry algorithms. While PPOS 400A is shown with three separate sensors, PPOS 400A operates with any one of these sensors; however, for purposes of safety and redundancy PPOS 400A utilizes a minimum number of three speed sensors in at least some embodiments.

In FIG. 4B and with reference to Table 1 above, SIL 4 PPOS 400B has a processor housing 418B, IMUs 414B & 414C, radar with MIMO antennas 412B & 412C, a UWB radio 416B each with two UWB antennas 432. PPOS 400B is comparable to PPOS 300 both structurally and operationally or PPOS 400B is structurally and operationally different from PPOS 300. PPOS 400B has a sensor housing that is comparable to sensor housing 306.

In at least some embodiments, where the safety critical level of integrity is high a SIL 4 PPOS, such as PPOS 400B, is used with minimal speed sensors to collect speed data. However, since safety is a concern redundancy is implemented with IMUs 414B and 414C and radars 412B and 412C.

In examples of the present disclosure, both SIL 0/2 PPOS, such as PPOS 200 and 400A, and SIL 4 PPOS, such as PPOS 300 and 400B, are upgraded to provide greater vehicle operational functionality and greater progression toward a full VOBC and implementation into a CBTC system. An example of an upgrade is shown in FIG. 5.

Figure 5:
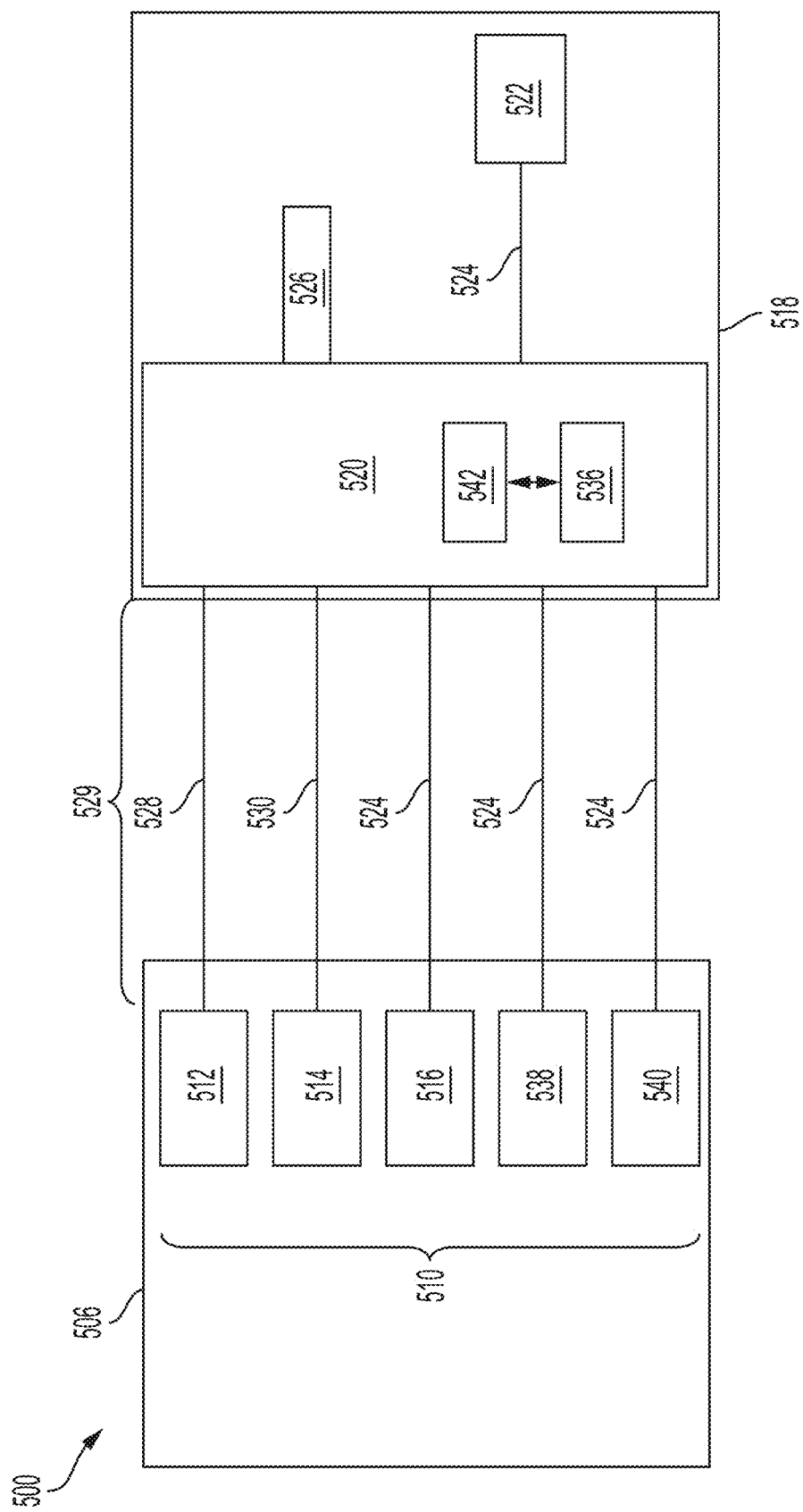
FIG. 5 is a high-level functional block diagram of an example PPOS with a GPU, in accordance with some embodiments.

FIG. 5 is a high-level functional block diagram of an example PPOS 500 with a GPU 534, in accordance with some embodiments. PPOS 500 is comparable to PPOSs 100, 200, 300, 400A and 400B both structurally and operationally. PPOS 500 is used on a vehicle such as vehicle 102, 402A or 402B. PPOS 500 has a sensor housing 506 that is comparable to sensor housings 106, 206, and 306. PPOS 500 has one or more sensors 510 that collect sensor data. Radar sensor 512 is similar to radar sensors 212, 412A or 412B. IMU 514 is similar to IMUs 214, 414A or 414B. UWB sensors 516 is similar to UWB sensors 216, 416A or 416B.

In at least some embodiments, sensor housing 506 houses sensors 510 that include radar with MIMO antennas 512, IMU 514, UWB radio with multiple antennas 516, camera 538 and LiDAR 540. Sensors 510 are electrically coupled through interfaces 529 to processor housing 518 and processing circuitry 520 through CAN bus 528, serial bus 530 and/or Ethernet bus 524. Processing circuitry 520 has a CPU/MCU 542 electronically coupled to a GPU 536 as higher processing can be necessary for the camera 538 and LiDAR 540.

In at least some embodiments, such as those requiring additional safety, sensors such as LiDAR 540 and a visible spectrum camera 538 can be added as additional hardware to a SIL 0/2 or SIL 4 PPOS. However, LiDAR 540 and camera 538 can require more processing power and thus an upgrade with a GPU 536 or other higher performance processing unit is required in at least some embodiments. Upgrade to a camera 538 and/or LiDAR 540 is performed on either the SIL 0/2 and/or SIL 4 PPOS in at least some embodiments. GPU 536 supports visible spectrum camera 538 and/or LiDAR 540 and their associated machine vision and/or neural network algorithms. Obstacle avoidance and/or other advanced capabilities rely on visible spectrum camera 538 and/or LiDAR 540 using machine vision, neural network and/or other advanced algorithms.

In at least some embodiments, camera 538 is a visible spectrum digital camera that utilizes machine learning to extract information from an image on an automated basis. The information extracted can be a complex set of data, such as the identity position and orientation of each object in an image. The information can be used for vehicle guidance. In at least some embodiments, LiDAR 540 uses ultraviolet, visible, or near infrared light to image objects. It can target a wide range of materials, including non-metallic objects, rocks, and rain. A narrow laser beam can map physical features with very high resolutions. This mapping is used to provide positioning data for processing circuitry 520 in at least some embodiments.

In at least some embodiments, processing circuitry 520 determines a vehicle's speed and motion direction (e.g., vector) based on measurements provided by speed and position measurement sensors 510 that are a radar 512, an optical sensor (not shown), a camera (e.g., video odometry) 538, a LiDAR (either coherent or non-coherent) 540, and/or UWB radio with antenna 516. Processing circuitry 520 calculates dead reckoning position of a vehicle. The dead reckoning position is determined by a fusion algorithm (e.g., using unscented Kalman Filter) that predicts the position using IMU measurements in at least some embodiments. The predicted position is constrained to a guideway map in at least some embodiments. As the vehicle is moving "on the guideway map", the vehicle's speed and location (e.g., when landmark is detected through camera 538 or LiDAR 540) are used to update the Kalman Filter's states providing accurate dead reckoning without observing a landmark for a relatively long distance (e.g., platform to platform, typically 2 to 5 km). The functionality of this dead reckoning process is described in patent CA2977730 and publications WO2018158712, U.S. Pat. Pub. No. 2020/0096362, U.S. Pat. Pub. No. 2020/0191938, and U.S. Pat. Pub. No. 2020/0198673 all of which are hereby incorporated by reference in their entireties.

In at least some embodiments, all vehicles first outfitted with a PPOS are eventually be upgraded to have ATO capabilities. ATO capabilities provide another step toward a fully functional VOBC for a CBTC system.

Figure 6:
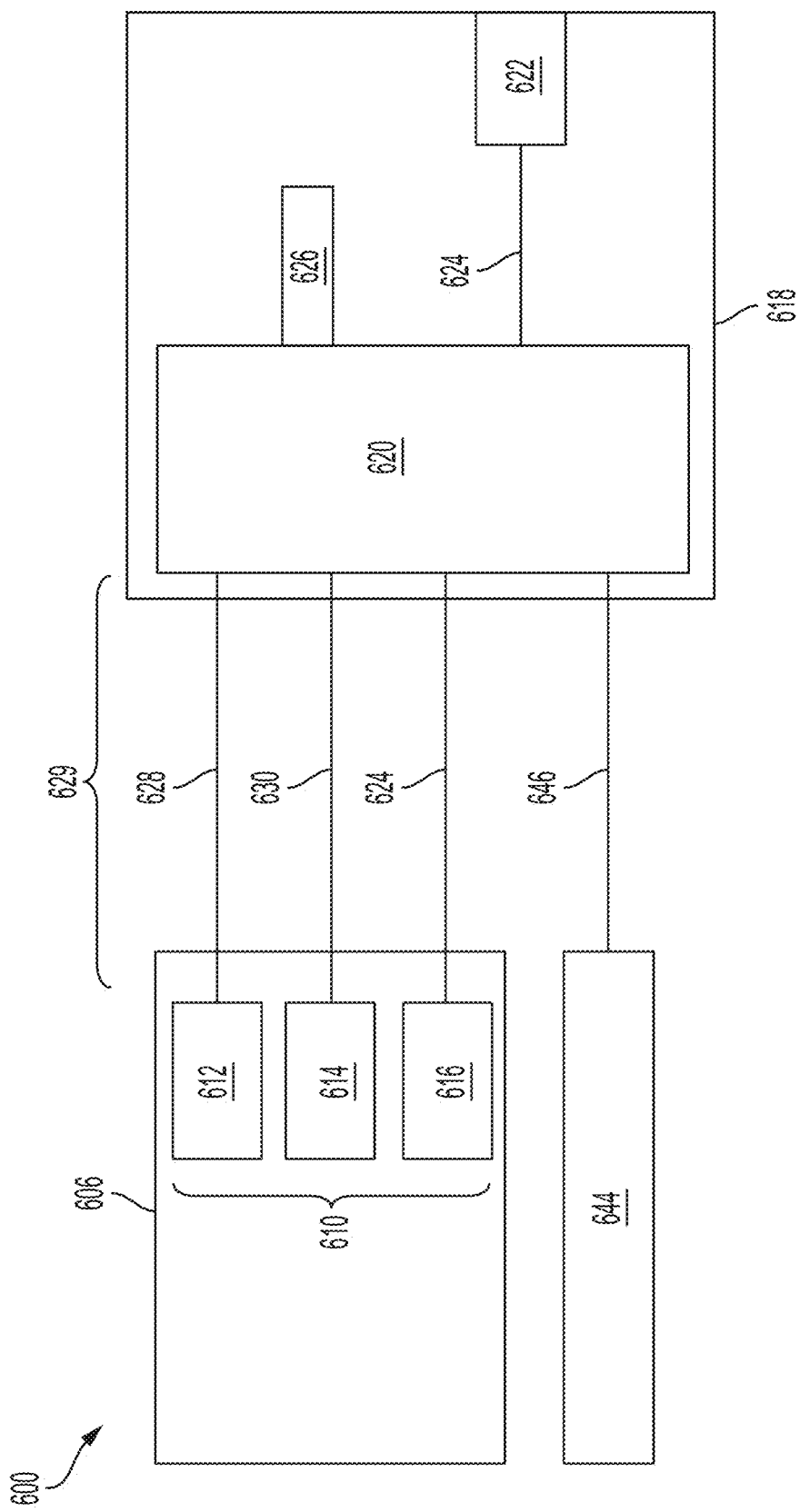
FIG. 6 is a high-level functional block diagram of an example PPOS with automatic train operation (ATO) capability, in accordance with some embodiments.

FIG. 6 is a high-level functional block diagram of an example PPOS 600 with automatic train operation (ATO) capability, in accordance with some embodiments. PPOS 600 is a SIL 0/2 PPOS or a SIL 4 PPOS as discussed previously. PPOS 600 is comparable to PPOS 100, 200, 300, 400A, 400B or 500 both structurally and operationally. PPOS 600 is used on a vehicle such as vehicle 102, 402A or 402B. PPOS 600 has a sensor housing 606 that is comparable to sensor housing 106, 206, 206, or 506. PPOS 600 has one or more sensors 610 that collect sensor data. Sensors 610 is operably coupled to portable housing 606 such that portable housing 606 protects and isolates sensors 610 from damage or interference. Portable housing 606 is coupled to a vehicle body, such as vehicle body 108. Processing circuitry 620 is operably coupled to sensors 610 through interfaces 629. Processing circuitry 620 determines, in response to collected sensor data from sensors 210, vehicle position and odometry data.

In at least some embodiments, sensor housing 606 has sensors 610, such as radar with MIMO antennas 612, IMU 614 and UWB radio with multiple antennas 616. Radar 612 is comparable to radar 212, 412A, 412B and 512. IMU 614 is comparable to IMU 214, 414A, 414B and 514. UWB 616 is comparable to UWB 216, 416, 416A, 416B and 516.

In at least some embodiments, sensors 610 are electrically coupled to processing circuitry 620 within processor housing 618 though interfaces 629 including CAN bus 628, Serial bus 630 and Ethernet 624. ID plug 626 and radio 622 are electrically coupled to processing circuitry 620 in at least some embodiments. ID plug 626 can operate comparable to ID plug 226 and 526. Radio 622 operates comparably to radio 222 and 522. Additionally or alternatively, a vehicle propulsion and braking system 644 is coupled to processing circuitry 620 through an analog interface 646 using pulse width modulation in at least some embodiments.

In at least some embodiments, PPOS 600 is an upgrade of either a SIL 0/2 PPOS, such as PPOS 200, and/or SIL 4 PPOS, such as PPOS 300, with ATO capabilities. The upgrade includes a hardware update including an analog interface 646 to the vehicle's propulsion and braking system 644 and software update to include an algorithm to: (1) control the propulsion and braking to follow a predefined speed profile and (2) accurately stop at a platform in consideration (e.g., constraint) of minimum travel time and minimum energy or the like in at least some embodiments. ATO capabilities provide for an autopilot feature controlling vehicle propulsion and braking system 644.

In at least some embodiments, railway vehicles with space or other installation related constraints, such as maintenance vehicles like vehicle 102, 402A or 402B in which the traditional VOBC does not fit in, utilize PPOS 600 that fits into and onto any vehicle. In some examples the PPOS provides SIL 0/2 positioning and odometry function while in other examples these functions are SIL 4 positioning and odometry functions. In some examples PPOS 600 is even further upgraded to provide limited ATP capability or complete ATP capability.

Figure 7:
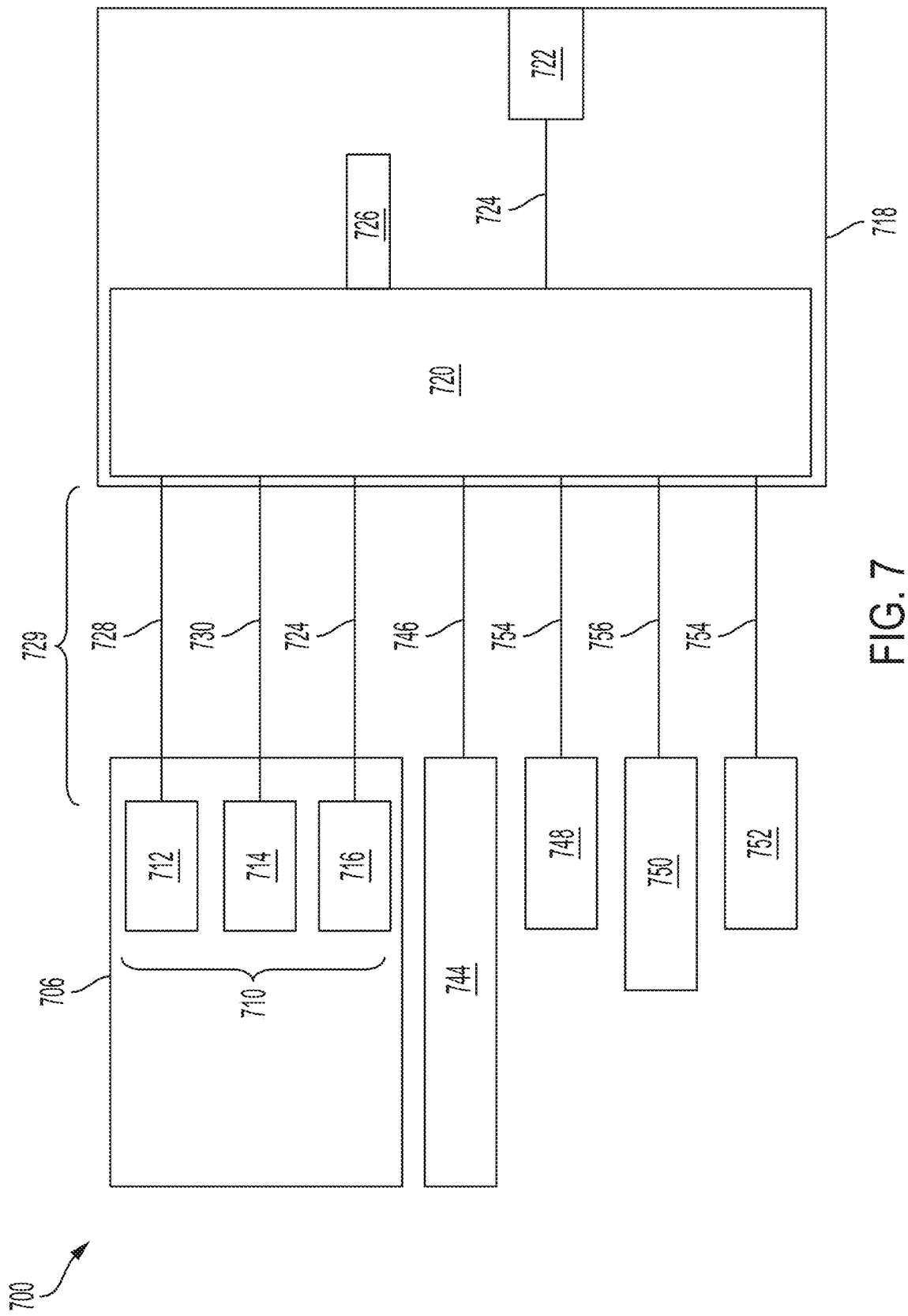
FIG. 7 is a high-level functional block diagram of an example PPOS with automatic train protection (ATP) capabilities, in accordance with some embodiments.

FIG. 7 is a high-level functional block diagram of an example PPOS 700 with automatic train protection (ATP) capabilities, in accordance with some embodiments. PPOS 700 is a SIL 0/2 PPOS or a SIL 4 PPOS as discussed previously. PPOS 700 is comparable to PPOS 100, 200, 300, 400A, 400B, 500 or 600 both structurally and operationally.

PPOS 700 is used on a vehicle such as vehicle 102, 402A or 402B. PPOS 700 has a sensor housing 706 that is comparable to sensor housing 106, 206, 206, 506 and 606. PPOS 700 has one or more sensors 710 that collect sensor data. Sensors 710 is operably coupled to portable housing 706 such that portable housing 706 protects and isolates sensors 710 from damage or interference. Portable housing 706 is coupled to a vehicle body, such as vehicle body 108. Processing circuitry 720 is operably coupled to sensors 610 through interfaces 629. Processing circuitry 620 determines, in response to collected sensor data from sensors 210, vehicle position and odometry data. Processing circuitry 720 is comparable and operate similarly to processing circuitry 220, 320, 520 and 620.

In at least some embodiments, sensor housing 706 houses sensors 710, such as radar with MIMO antennas 712, IMU 714 and UWB radio with multiple antennas 716. Radar 712 can be similar to radar 212, 412A, 412B, 512 and 612. IMU 714 can be similar to IMU 214, 414A, 414B, 514 and 614. UWB 716 can be similar to UWB 216, 416A, 416B, 516 and 616. In at least some embodiments, sensors 710 are electrically coupled to processing circuitry 720 within processor housing 718 though interfaces 729 including CAN bus 728, Serial bus 730 and/or Ethernet 724. ID plug 726 and radio 722 are electrically coupled to processing circuitry 720 in at least some embodiments. Additionally or alternatively, a vehicle propulsion and braking system 744 is coupled to processing circuitry 720 through an analog interface 746 using pulse width modulation. An emergency braking system 748, doors system 750 and train lines system 752 is coupled to processing circuitry 720 through discrete buses 754 and discrete/Ethernet bus 756 in at least some embodiments.

Upgrade of the SIL 0/2 PPOS into a SIL 4 PPOS consists of S/W updates if the PPOS H/W is already suitable for application, or it consists of both S/W and H/W updates in at least some embodiments. PPOS 700 is updated to add basic ATP functions such as over speed supervision, movement authority determination and supervision, or the like in at least some embodiments. Additionally or alternatively, radio 722 serves as the interface with trackside units and a database is updated to contain speed limits, braking rates and other parameters as necessary to accomplish these functions.

In at least some embodiments, PPOS 700 is updated to interface with a user either on-board the host vehicle or in central control office to provide speed profiles, vehicle location and speed information for display and/or tracking purposes. By upgrading PPOS 700, maintenance vehicles or other non-standard vehicles in which, due to space constraints or other constraints where there is no room for full VOBC, PPOS 700 is used in place of a VOBC and provide the functionality of a VOBC system in at least some embodiments. Upgrade of PPOS 700 with full ATP capabilities includes complete interface to the vehicle (e.g., emergency brakes (EB), doors, train integrity, coupling status and other train-lines interfaces) and the associated functions such as EB supervision, doors control, train integrity supervision, train length determination, or the like.

In at least some embodiments, each of SIL 0/2 PPOS and SIL 4 PPOS is upgraded at any time. Additionally or alternatively, upgrades are software based, hardware based or a combination of both. Further, the processing circuitry has an architecture that allows for modular upgrades, where each portion of a system is handled or controlled by a specific module in at least some embodiments.

Figure 8:
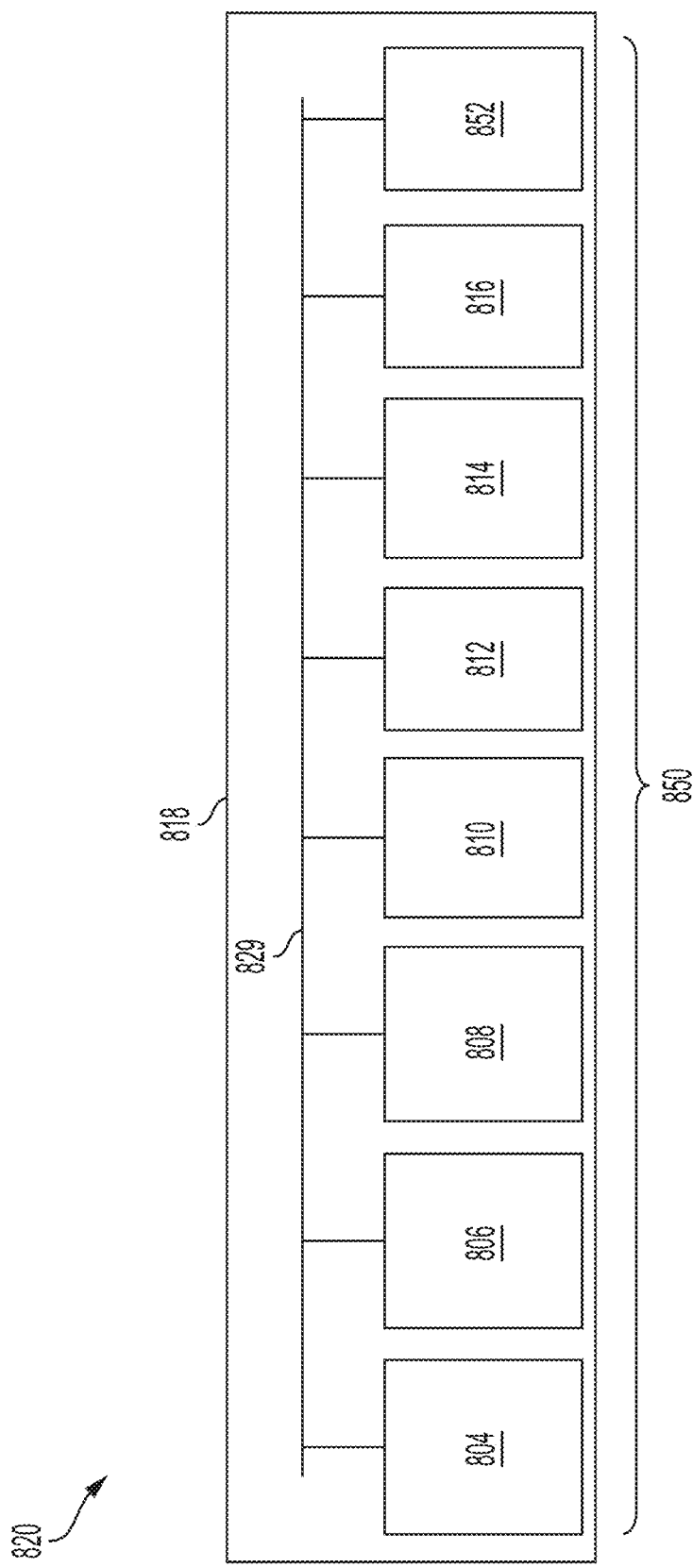
FIG. 8 is a high-level functional block diagram of an example processing circuitry modular design for a PPOS, in accordance with some embodiments.

FIG. 8 is a high-level functional block diagram of an example processing circuitry modular design for a PPOS, in accordance with some embodiments. Processing circuitry 820 is comparable to processing circuitry from any of the previously discussed PPOS, such as processing circuitry 220, 320, 520, 620 and 720. Processing circuitry 820 has modules 850. Modules 850 are modules that come preinstalled within processor housing 818, such as processor housing 218, 418A, 418B, 518, 618 and 718 or one or more modules 850 are installed during upgrades. Modules 850 have a CPU/MCU module 804, a CAN protocol converter module 806, serial protocol converter module 808, Ethernet switch module 810, analog/PWM module 812, discrete signals module 814, an ID module 816 and a GPU module 818. Modules 850 are electronically coupled by processing circuitry interface 829

In at least some embodiments, processing circuitry 820 has a modular design to support the many different use examples described in this description. The modular design of processing circuitry 820 takes into consideration of the size, processing power, interfaces, SIL, or the like in at least some embodiments. Alternatively or additionally, each PPOS has processing circuitry 820 with architecture suitable for the functions it is expected to deliver. Therefore, in at least some examples, processing circuitry 820 is designed in a modular architecture to support different configurations. Processing circuitry 820 is modular and support multiple configurations to meet the size and interface constraints of multiple applications including the SIL and the processing power required to deliver the expected functions in at least some embodiments.

In at least some examples, module 804 is a CPU or MCU similar to processors 321 or CPU/MCU 542 or module 804 is most any processor or processing unit such as any digital circuit that performs operations on some external data source, such as memory or some other data stream, such as a microprocessor. As discussed with regards to FIG. 3, one or more CPU/MCU modules 804 is present or is added later in an upgrade; for example when migrating from a SIL 0/2 to a SIL 4 in at least some embodiments.

In at least some embodiments, module 806 for CAN protocol conversion has a CPU, microprocessor, or host processor within module 806 that decides what received messages from sensors, actuators and control devices within a PPOS mean and what messages it wants to transmit to CPU/MCU module 804. In at least some examples, module 806 stores the received serial bits from interface 829 until an entire message is available, which is then fetched by module 804 (e.g., usually by a CAN controller triggering an interrupt). The CPU within module 806 sends a transmit message(s), which transmits the bits serially onto interface 829 when interface 829 is free in at least some embodiments. Additionally or alternatively, module 806 has a transceiver that converts a data stream from CAN bus levels to levels that a CAN controller uses. A message consists of an ID (identifier), which represents the priority of the message, and up to eight data bytes in at least some embodiments.

In at least some examples, module 808 is used to convert serial protocol of one device, such as an IMU, to a protocol suitable for module 804 to achieve the interoperability. Additionally or alternatively, module 808 has software installed on an internal CPU/MCU that converts the data formats, data rate and protocols of a serial bus into the protocols of module 804.

In at least some embodiments, Ethernet module 810 connects other devices within a PPOS together. In at least some examples, multiple data cables are plugged into module 810 to enable communication between different networked devices throughout the PPOS. Module 810 manages the flow of data across interface 829 by transmitting a received network packet only to the one or more devices for which the packet is intended in at least some embodiments. Additionally or alternatively, each networked device connected to module 810 is identified by its network address, allowing module 810 to direct the flow of traffic maximizing the security and efficiency of the network.

In at least some embodiments, analog module 812 connects all analog devices such as the propulsion and braking system. Additionally or alternatively, module 812 controls communication to and from the propulsion and braking system and then converts the analog signals from the propulsion and braking system into digital signals for communication with module 804. Further, module 812 converts any commands from module 804 into an analog signal for control of the propulsion and braking system in at least some embodiments.

In at least some examples, discrete module 814 connects systems utilizing programmable logic controllers (PLC), such as the emergency braking systems, automatic door systems and train lines systems. Module 814 has a CPU/MCU for processing instructions from module 804 and creating and sending instructions to PLCs through the PPOS in at least some embodiments. Additionally or alternatively, the instructions are used to open and close doors on the vehicle the PPOS is coupled too. The instructions are used for emergency braking as well in at least some examples.

In at least some embodiments, ID module 816 is utilized for identification of the PPOS through an ID plug coupled to module 804. Additionally or alternatively, module 816 processes any communications through the radio coupled to processing circuitry 820 for identifying other PPOSs and/or off-vehicle platforms. Module 816 is used for developing the guideway map discussed in the description previously by identifying other PPOS platforms providing information to be incorporated into the guideway map in at least some embodiments.

Module 852 is a module containing a GPU and electronically coupled to module 804 through bus 820 in at least some examples. Module 818 supports sensors such as a visible spectrum camera and/or LiDAR and their associated machine vision and/or neural network algorithms in at least some embodiments. Additionally or alternatively, module 818 is electrically coupled to a display (not shown) through bus 820 for an operator.

Figure 9:
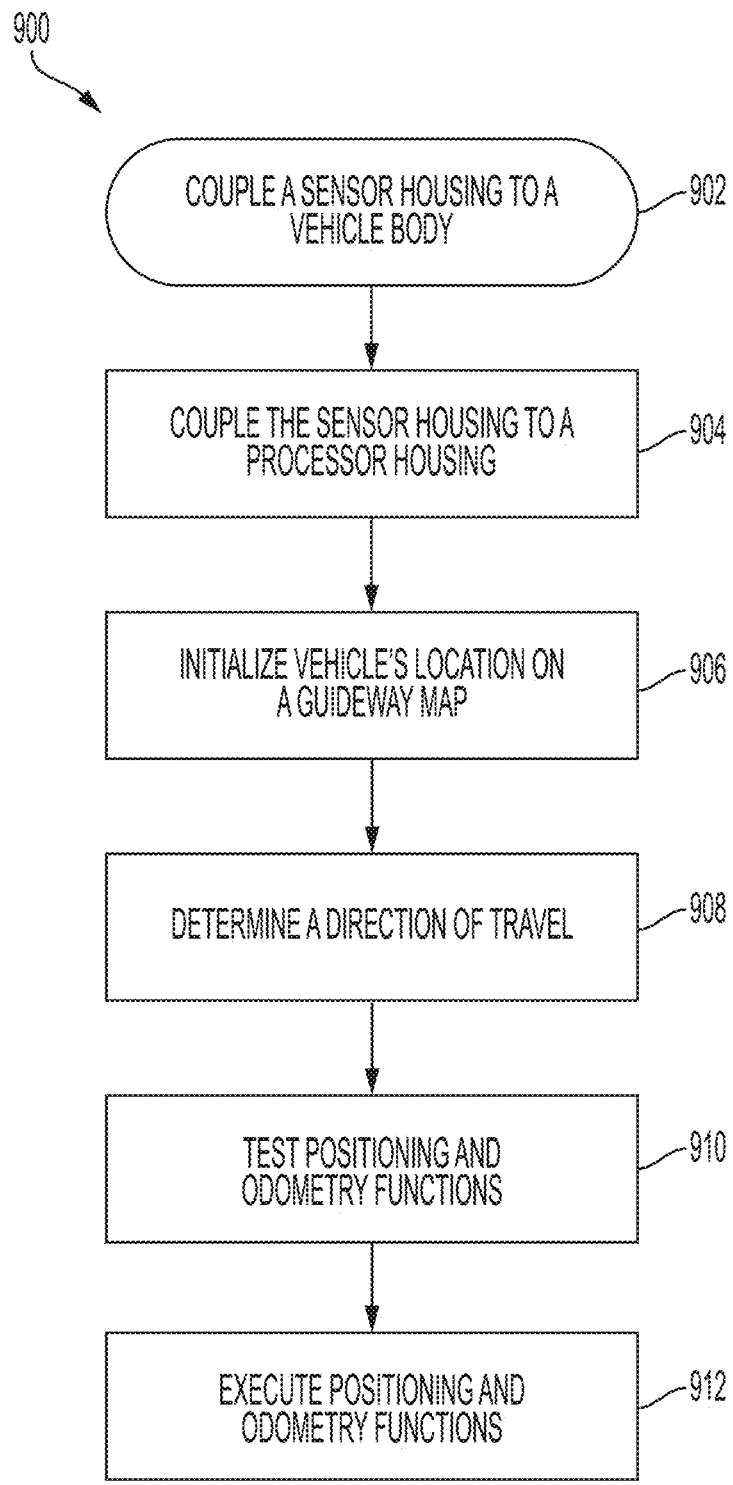
FIG. 9 is a flow diagram of an example method for implementing a PPOS, in accordance with some embodiments.

FIG. 9 is a flow diagram of an example method for implementing a PPOS 900, in accordance with some embodiments. When a vehicle enters a CBTC system it is desirable to know position and odometry information for the vehicle. It is desirable to know the vehicle's position for the safety of other vehicles in the CBTC system. A PPOS is coupled to a vehicle (902). A user or operator couples a sensor housing having one or more sensors onto the vehicle body. A processor housing is placed in or on the vehicle body and the processor housing and sensor housing is coupled with interfaces (904).

In at least some embodiments, on power up (e.g., a cold start) of a PPOS or upon recovery from position loss, the processing circuitry initializes the vehicle's location on a guideway by detecting a landmark with a unique signature which has its location and characteristics defined in the guideway map (906). A distance to the land mark is either measured or estimated, with a radar or UWB, defining the vehicle's location with respect to the guideway map.

A direction of travel with respect to the map is determined either by detecting two adjacent landmarks, or by detecting a single unique landmark and using additional measurements such as compass direction provided by the inertial measurement unit (IMU) magnetometers (908) in at least some embodiments. A direction of travel is determined, in at least some examples, by detecting a single unique landmark and while the vehicle is in motion measuring the changes in the measured distance to the landmark.

The PPOS determines the vehicle's speed and motion direction based on measurements provided by a speed measurement sensor which is a Doppler radar, an optical sensor, a camera (video odometry), a LiDAR (either coherent or non-coherent), and/or UWB radio in at least some examples. Dead reckoning position of the vehicle is determined by a fusion algorithm (using unscented Kalman Filter) predicting the position using IMU measurements. The predicted position is constrained to the guideway map (e.g., as the vehicle is moving on the guideway map, the vehicle's speed and location (e.g., when a landmark is detected) is used to update the filter's states by providing accurate dead reckoning without observing a landmark for a relatively long distance (i.e., platform to platform, typically 2 to 5 km).

Additionally or alternatively, the length of the vehicle is determined by placing sensor housings at each end of the vehicle and after initialization of the PPOS, comparing the locations reported by each sensor housing in at least some examples. The PPOS individually cross compares each sensor housing's reported positions and calculates the length of the train in at least some embodiments. Alternatively or additionally, each sensor housing individually reports their positions and the train length is determined by a wayside computer. The continuous reporting of the position of train length provides another mechanism for parted train protection in at least some embodiments. Frequent monitoring of train length is combined with an alarm mechanism if a change in length is detected (e.g., a potential break away car or other fault causing a safety issue).

Another approach to determine the length of the train is based on determining how many vehicles in the train are coupled to other vehicles at both ends and how many vehicles in the train are coupled at one end only. Then using the vehicle length, a train length is determined. Details related to one or more of the foregoing functionality are described in one or more of WO2018158711, WO2018158712, Canadian Patent CA2977730 "Guideway Mounted Vehicle Localization System," U.S. application Ser. No. 16/143,035 and published as U.S. 2019/0092360 entitled "Guideway Mounted Vehicle Localization and Alignment System and Method," U.S. application Ser. No. 16/430,194 entitled "System For and Method of Data Encoding and/or Decoding Using Neural Networks," U.S. Patent Pub. No. 2020/0096362 entitled "Stationary State Determination, Speed Measurements," U.S. Application No. 62/779,949 entitled "Vehicle Odometry and Motion Direction Determination Using COTS Radar," U.S. Application No. 62/779,969 entitled "Obstacle Avoidance and Remote Localization Method for Railway Vehicle Using Range Measurement Beacon Array," U.S. Application No. 62/782,077 entitled "Grade and Acceleration Due to Motoring and Breaking Determination," U.S. Application No. 62/901,989 entitled "Method and System for High-Integrity Vehicle Localization and Speed Determination" hereby incorporated by reference herein in their entireties.

In at least some embodiments, when a PPOS is coupled to a vehicle, testing is performed based on sensor data collected from the one or more sensors in the sensor housing of the positioning and odometry functions executed by the processing circuitry 910. For example, during the deployment of the PPOS, PICO and system verification tests is performed. The safety properties of the system is ensured outside the scope of the PPOS. When the testing is complete, the PPOS executes positioning and odometry functions according to the SIL assigned to the PPOS 912 in at least some embodiments.

Figure 10:
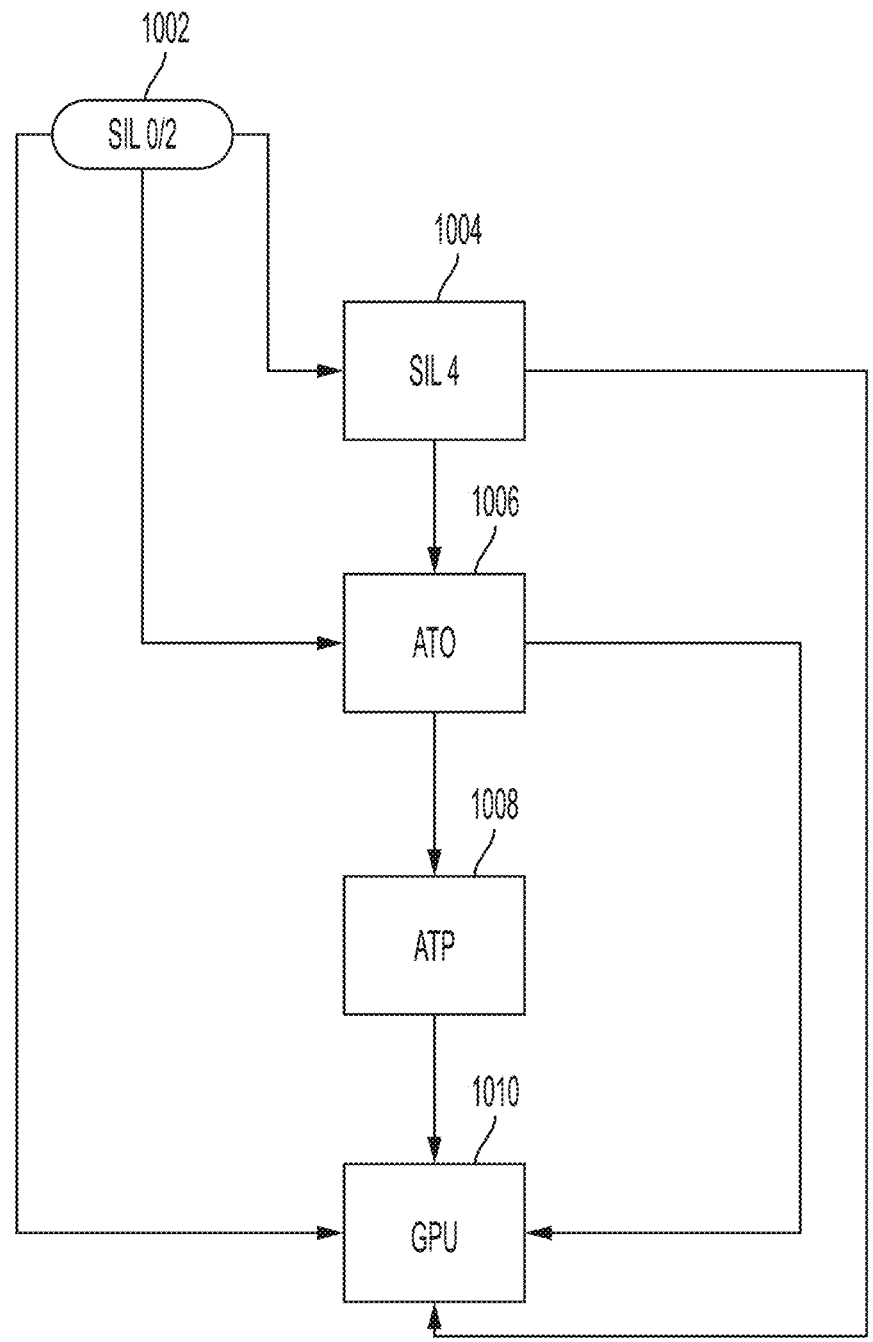
FIG. 10 is a flow diagram of an example method for upgrading a PPOS, in accordance with some embodiments.

FIG. 10 is a flow diagram of an example method for upgrading a PPOS, in accordance with some embodiments. To implement a CBTC system from an initial PPOS, upgrades occurs at appropriately timed intervals or depending on an intended location of a vehicle, time and effort needed to install sensors, facilities and location required to install the sensors, or performance parameters of positioning and odometry functions.

In at least some embodiments, a SIL 0/2 PPOS is deployed on a vehicle having a lower safety concern. A lower safety concern means the vehicle will not be traveling far during testing or will not be active on a CBTC track or guideway, or the vehicle will be protected via Manual Route Reservation (MRR) imposed by the central control room operator, the vehicle will be protected by the another on-board system with SIL 4 properties (such as a legacy system). SIL 0/2 is deployed first to collect sensors measurements and to verify that the positioning and odometry functions are working reliably and accurately during the PICO tests and during shadow testing (e.g., comparing position and odometry data with a CBTC vehicle shadowing the test vehicle) until the formal commissioning tests begin 1002 in at least some embodiments.

In at least some examples, the SIL 0/2 PPOS is tested to build confidence in its operation and safety. The SIL 0/2 PPOS is used vehicle by vehicle and in a zone by zone approach to determine if the positioning and odometry functions operate sufficiently while the system safety is ensured by existing signaling. Additionally or alternatively, SIL 0/2 is useful as a first step in system migration to a CBTC. In at least some examples, a SIL 0/2 system is upgraded to a SIL 4 system 1004, an ATO system 1006 or a camera or LiDAR based system 1010. The modularity of the examples of the present description show how flexible the PPOSs are with their modularity.

SIL 0/2 is upgraded after testing into a SIL 4 PPOS 1004 in at least some embodiments. The upgrade consists of S/W updates if the PPOS H/W is already suitable for a SIL 4 application, or it consists of both S/W and H/W updates. A CBTC system can track vehicles with a SIL 4 PPOS without relying upon a secondary train detection system and can ensure that controlled trains do not interfere with the movement of these tracked trains in at least some examples.

In at least some embodiments, SIL 0/2 and SIL 4 PPOSs are upgraded with ATO capabilities 1006. Additionally or alternatively, the upgrade includes H/W additions including an interface with the vehicle's propulsion and braking system and S/W additions including algorithms to control the propulsion and braking to follow a predefined speed profile, accurately stop at the platform in consideration (e.g., constraint) of minimum travel time, minimum energy, or the like.

In at least some embodiments, a PPOS is updated to add basic ATP functions such as over speed supervision, movement authority determination and supervision, or the like 1008. Additionally or alternatively, a radio may serve as the interface with trackside units and a database may require an S/W update to contain speed limits, braking rates and other parameters as necessary to accomplish these functions. This provides, in at least some examples, for full protection for a train without reliance on secondary train detection, including an ability to stop the train if it violates an ATP limit. If the train interface includes propulsion and braking the unit can offer additional ATO functions. Maintenance trains are fully protected while minimizing the operational impact of closure of larger areas of track, which is necessary if location of the maintenance trains are not tracked.

In at least some embodiments, the portable positioning system is upgraded to interface with a user either on-board the host vehicle or in central control office to provide speed profiles, vehicle location and speed information for display and/or tracking purposes.

In at least some embodiments, upgrading with full ATP capabilities includes a complete interface to a vehicle (e.g., emergency brakes, doors, train integrity, coupling status and other train-line interfaces) and the associated functions such as emergency braking (EB) supervision, doors control, train integrity supervision, train length determination, or the like. This upgrade provides full CBTC functionality. In at least some examples, a train based migration upgrades a fleet in stages with scalable platforms, such as the PPOS. Older trains not suitable for a full VOBC are able to interoperate fully with a PPOS with full ATP capabilities that allow it to operate with full CBTC functionality.

In at least some embodiments, an upgrade of either the SIL 0/2 PPOS or the SIL 4 PPOS with a GPU to support sensors such as visible spectrum camera and/or LiDAR and their associated machine vision and/or neural network algorithms occurs at any time 1010. Thus, a SIL 0/2 PPOS, a SIL 4 PPOS, with ATO, without ATO, with ATP, without ATP can have CBTC capabilities, such as obstacle avoidance on vehicles equipped with the portable positioning system. Additionally or alternatively, the upgrade to a GPU occurs at any time depending on other factors, such as space, equipment, time, purpose, or the like.

The system proposed in one or more embodiments of this disclosure solves one or more of the problems not solved by existing technologies and meets one or more of the currently unmet needs.

The scalable platform, which is deployed in its most basic configuration, in at least some examples, as a PPOS suggested in this disclosure is a simple device designed to interface with a minimal amount of sensors and with radio/network device. Additionally or alternatively, PPOS contains a single CPU/MCU in the SIL 0/2 configuration or 2 CPU/MCU in checked redundant manner in the SIL 4 configuration. PPOS collects the sensors measurements and processes the measurements to determine a vehicle's position, speed and direction on a guideway in at least some examples. These attributes are communicated to central control office and/or another computer on-board the vehicle in at least some embodiments. The vehicle's position, speed and direction as determined by the PPOS are used to perform the PICO verification of trackside equipment (e.g., retroreflectors, signs, anchors, or the like) installation.

In at least some embodiments, the PPOS and its associated sensors are small in size, easy to install on any vehicle and are used to perform PICO tests even though the vehicle is not fully equipped with the CBTC system yet.

In at least some embodiments, the PPOS is used for PICO verification of on-board sensors installation even though a vehicle is not fully equipped with a CBTC system yet.

In at least some embodiments, PPOS is used for verification and confidence buildup of the positioning and odometry functions even though the vehicle is not be fully equipped with the CBTC system yet. The performance, accuracy and reliability of these functions can be tested over a relatively long period of time without any dependency on other CBTC items.

In at least some embodiments, capabilities that are not available with the traditional CBTC system, such as obstacle avoidance, are made available with the scalable platform to railway vehicles and in particular to maintenance vehicles or other types of rail vehicles with tight installation constraints.

In at least some embodiments, the portable positioning system enables maintenance vehicles, or other types of rail vehicles with tight installation constraints, with fine positioning granularity tracking capability that otherwise are not available due to installation constraints.

In at least some embodiments, the scalable platform, which can be used as a portable positioning and speed system suggested in the disclosure consists of: a minimum viable sensor set (UWB, radar and IMU) providing measurements to the positioning and odometry functions. The proposed sensors are body mounted and not bogie, wheel or axle mounted and therefore easier to install than the traditional CBTC sensors, such as tachometer, speed sensor and RFID tag reader, that are bogie, wheel or axle mounted in at least some embodiments.

In at least some embodiments, these sensors are packaged in a single enclosure mounted on the vehicle's body resulting in short installation time but even more importantly the installation does not require access to a maintenance pit because the sensors are body mounted and not bogie, wheel or axle mounted.

Figure 11:
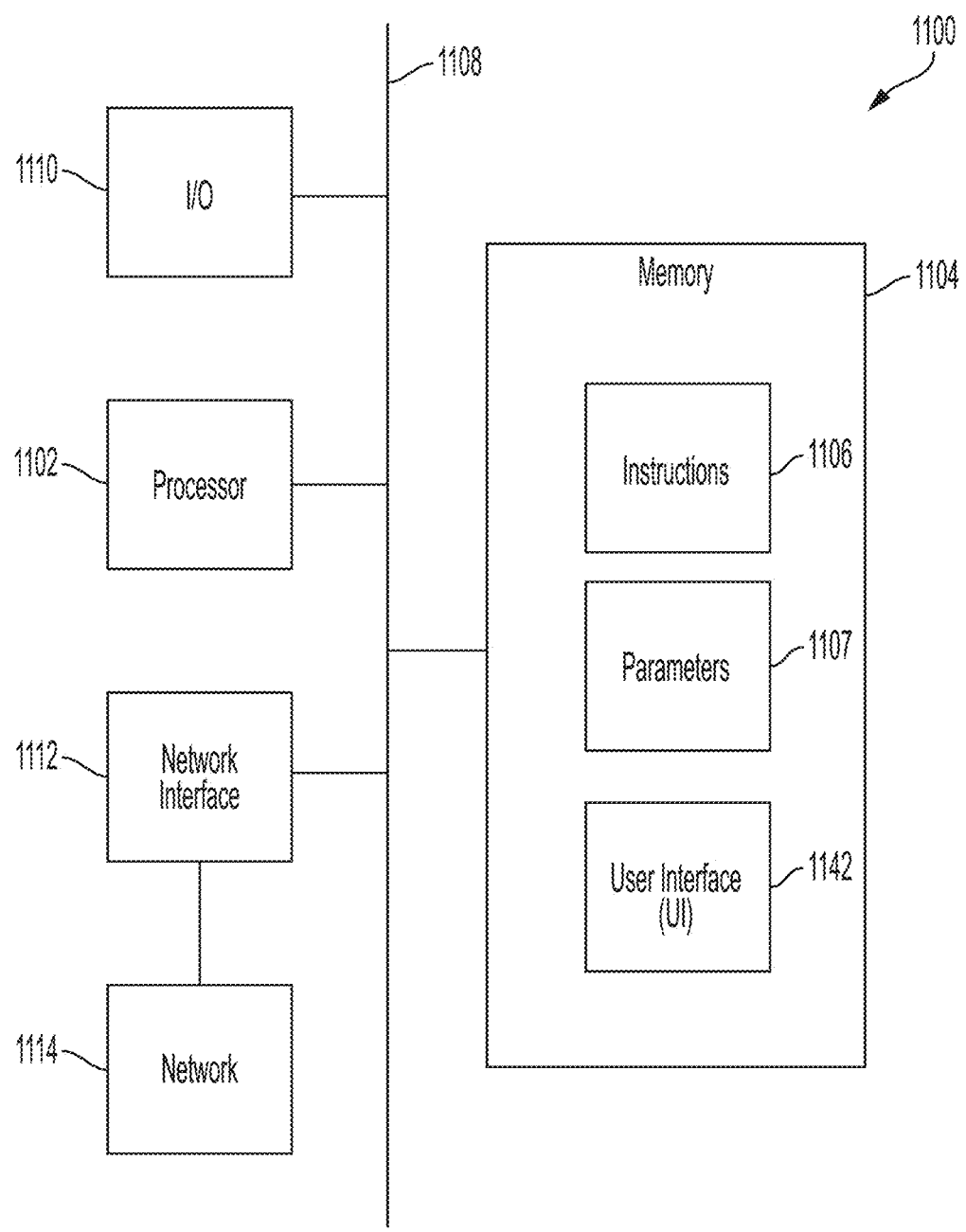
FIG. 11 is a high-level functional block diagram of a processor-based system, in accordance with some embodiments.

FIG. 11 is a block diagram of an example PPOS processing circuitry 1100 in accordance with some embodiments. PPOS processing circuitry 1100 is comparable to, similar or functionally equivalent to processing circuitry 220, 320, 520, 620, 720 and 820. In some embodiments, PPOS processing circuitry 1100 is a general purpose computing device including a hardware processor 1102 and a non-transitory, computer-readable storage medium 1104. Storage medium 1104, amongst other things, is encoded with, i.e., stores, computer program code 1106, i.e., a set of executable instructions. Execution of instructions 1106 by hardware processor 1102 represents (at least in part) a positioning and odometry tool which implements a portion or all of the methods described herein in accordance with one or more embodiments (hereinafter, the noted processes and/or methods).

Processor 1102 may be electrically coupled to a computer-readable storage medium 1104 via a bus 1108. Processor 1102 may also be electrically coupled to an I/O interface 1110 by bus 1108. A network interface 1112 is also electrically connected to processor 1102 via bus 1108. Network interface 1112 is connected to a network 1114, so that processor 1102 and computer-readable storage medium 1104 are capable of connecting to external elements via network 1114. Processor 1102 is configured to execute computer program code 1106 encoded in computer-readable storage medium 1104 in order to cause PPOS processing circuitry 1100 to be usable for performing a portion or all of the noted processes and/or methods. In one or more embodiments, processor 1102 is a central processing unit (CPU), a multi-processor, a distributed processing system, an application specific integrated circuit (ASIC), and/or a suitable processing unit.

In one or more embodiments, computer-readable storage medium 1104 is an electronic, magnetic, optical, electromagnetic, infrared, and/or a semiconductor system (or apparatus or device). For example, computer-readable storage medium 1104 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1104 includes a compact disk-read only memory (CD-ROM), a compact disk-read/write (CD-R/W), and/or a digital video disc (DVD).

In one or more embodiments, storage medium 1104 stores computer program code 1106 configured to cause PPOS processing circuitry 1100 to be usable for performing a portion or all of the noted processes and/or methods. In one or more embodiments, storage medium 1104 also stores information which facilitates performing a portion or all of the noted processes and/or methods. In one or more embodiments, storage medium 1104 stores parameters 1107.

PPOS processing circuitry 1100 includes I/O interface 1110. I/O interface 1110 is coupled to external circuitry. In one or more embodiments, I/O interface 1110 includes a keyboard, keypad, mouse, trackball, trackpad, touchscreen, and/or cursor direction keys for communicating information and commands to processor 1102.

PPOS processing circuitry 1100 may also include network interface 1112 coupled to processor 1102. Network interface 1112 allows PPOS processing circuitry 1100 to communicate with network 1114, to which one or more other computer systems are connected. Network interface 1112 includes wireless network interfaces such as BLUETOOTH, WIFI, WIMAX, GPRS, or WCDMA; or wired network interfaces such as ETHERNET, USB, or IEEE-864. In one or more embodiments, a portion or all of noted processes and/or methods, is implemented in two or more PPOS processing circuitry 1100.

PPOS processing circuitry 1100 is configured to receive information through I/O interface 1110. The information received through I/O interface 1110 includes one or more of instructions, data, design rules, libraries of standard cells, and/or other parameters for processing by processor 1102. The information is transferred to processor 1102 via bus 1108. PPOS processing circuitry 1100 is configured to receive information related to a UI through I/O interface 1110. The information is stored in computer-readable medium 1104 as user interface (UI) 1142.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a positioning and odometry system (POS). The POS also includes one or more sensors that collect sensor data. The one or more sensors are operably coupled to a portable housing configured to be coupled to a vehicle body. Processing circuitry is operably coupled to the one or more sensors. The processing circuitry determines, in response to the collected sensor data from the one or more sensors, vehicle position and odometry data. Other embodiments of this aspect include corresponding computer systems, apparatus, and computer programs recorded on one or more computer storage devices, each configured to perform the actions of the methods.

In at least some embodiments, implementations include one or more of the following features. The POS where the one or more sensors include an ultra-wide band with multiple antennas, a radar with MIMO antennas, and an inertial measurement unit. The processing circuitry includes a first processor and a second processor configured to be coupled to one another in at least some embodiments. The POS includes a radio, operably coupled with the processing circuitry and configured to communicate with positioning devices within a communication-based train control (CBTC) system in some examples. The POS includes a visible spectrum camera and a LiDAR operably coupled to the processing circuitry in at least some examples. The POS may include a graphical processing unit (GPU) operably coupled to the processing circuitry to support processing of the visible spectrum camera and the LiDAR. The processing circuitry has a modular architecture that is upgradable to provide a vehicle onboard controller in a CBTC system. Implementations of the described techniques may include hardware, a method or process, or computer software on a computer-accessible medium.

One aspect includes a positioning and odometry system (POS). The POS also includes a portable processing unit. A portable sensor housing unit may include: at least two ultra-wideband (UWB) antennas operably coupled with the portable processing unit, one or more multiple-input multiple-output (MIMO) radar antennas operably coupled with the portable processing unit, and at least one inertial measurement unit (IMU) operably coupled with the portable processing unit. Other embodiments of this aspect include corresponding computer systems, apparatus, and computer programs recorded on one or more computer storage devices, each configured to perform the actions of the methods.

Implementations may include one or more of the following features. The POS as claimed where the POS may include only a single radar antenna coupled with the processing unit. The POS may include only a single IMU coupled with the portable processing unit. The POS may include at least two radar antennas coupled with the processing unit. The POS may include at least two IMUs coupled with the processing unit. The POS may include at least two radar antennas coupled with the processing unit and at least two IMUs coupled with the processing unit. Implementations of the described techniques may include hardware, a method or process, or computer software on a computer-accessible medium.

One aspect includes receiving, at processing circuitry, sensor data from one or more sensors operably coupled to a portable housing configured to be coupled to a vehicle body entering a communication-based vehicle control system; and determining, in response to the received sensor data from the one or more sensors, by processing circuitry operably coupled to the one or more sensors, vehicle position and odometry data. Other embodiments of this aspect include corresponding computer systems, apparatus, and computer programs recorded on one or more computer storage devices, each configured to perform the actions of the methods.

Implementations may include one or more of the following features. The method may include: verifying, by the processing circuitry, the vehicle position and the odometry data is reliable through post installation check out (PICO) tests. The method may include: executing, by the processing circuitry, automatic train protection functions. The method may include: executing, by the processing circuitry, automatic train operation functions. The method may include: displaying, by the processing circuitry, visible spectrum camera data and LiDAR data. Implementations of the described techniques may include hardware, a method or process, or computer software on a computer-accessible medium.

One aspect includes operably coupling a sensor housing body to a vehicle body, where the sensor housing body may include one or more sensors; testing, by processing circuitry operably coupled to the one or more sensors, in response to sensor data collected from the one or more sensors, positioning and odometry functions stored in memory circuitry operably coupled to the processing circuitry; and executing, by processing circuitry and responsive to successful testing of the positioning and odometry functions. Other embodiments of this aspect include corresponding computer systems, apparatus, and computer programs recorded on one or more computer storage devices, each configured to perform the actions of the methods.

Implementations may include one or more of the following features. The method as claimed may include: selecting a viable sensor set from the one or more sensors, creating the sensor housing for the viable sensor set, and creating a modular processing architecture from the processing circuitry to support the viable sensor set. The viable sensor set is a minimum viable sensor set. The sensor housing is created based on one or more of: an intended location on a vehicle, time and effort needed to install sensors of the viable sensor set, facilities and location required to install the sensors, or performance parameters of positioning and odometry functions. A modular processing unit is created based on support of one or more use cases. The modular processing unit is created based on one or more of: size, processing power, interfaces, or level of safety integrity. The method as claimed may include: installing the modular processing unit with the vehicle body. At a time after installation of the sensor housing and the modular processing unit with the vehicle body, one or the other of the sensor housing or the modular processing unit is modified. The modification of the sensor housing includes adding one or more additional sensors to the viable sensor set. Implementations of the described techniques may include hardware, a method or process, or computer software on a computer-accessible medium.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A positioning and odometry system (POS) comprising:
a vehicle configured to operate in a communication-based train control (CBTC) system, the vehicle including:
a vehicle bogie configured to travel along a track; and
a vehicle body that includes a mounting space separate from the vehicle bogie, wherein the mounting space is a sub-rack measuring less than 3U in height;
a first portable housing in the mounting space and coupled to the vehicle body, the first portable housing including sensors configured to collect vehicle positioning and odometry data, the sensors including an ultra-wideband (UWB) radio, a radar, and an inertial measurement unit (IMU), each enclosed in the first portable housing; and
a second portable housing, separate from the first portable housing, including:
processing circuitry operably coupled to the UWB radio, the radar, and the IMU; and
a radio configured to perform radio communications with a trackside unit,
the processing circuitry being configured to determine, in response to the collected vehicle positioning and odometry data from the sensors:
vehicle position; and
vehicle speed,
the determining the vehicle position including measuring a distance from the vehicle to a landmark using data from the UWB radio.

2. The POS of claim 1, wherein:
the second portable housing is coupled to the vehicle body, and
the radio is operably coupled with the processing circuitry.

3. The POS of claim 1, further comprising:
a camera operably coupled to the processing circuitry; and
a LiDAR operably coupled to the processing circuitry, wherein:
the second portable housing is coupled to the vehicle body, and
the second portable housing includes the camera and the LiDAR.

4. The POS of claim 3, further comprising:
a graphical processing unit (GPU) operably coupled to the processing circuitry to support processing of the camera and the LiDAR, the GPU and the processing circuitry being included in the first portable housing.

5. The POS of claim 3, wherein the camera is a visible spectrum camera or a near IR camera.

6. The POS of claim 1, wherein:
the processing circuitry is configured to operably connect to additional portable housings that, when combined together, create a modular VOBC in the CBTC system.

7. The POS of claim 1, wherein:
the POS determines the speed without coupling to a sensor on the vehicle bogie.

8. The POS of claim 1, wherein:
the IMU is a first IMU,
the POS further comprises a second IMU, and
the first IMU and the second IMU are both enclosed in the first portable housing.

9. A portable positioning and odometry system (PPOS) comprising:
a processing unit;
a communications radio;
an ultra-wideband (UWB) radio;
a first radar;
a first inertial measurement unit (IMU); and
at least one interface coupling the processing unit to the UWB radio, the first radar, and the first IMU,
wherein:
the processing unit and the communications radio are enclosed in a first single enclosure that is configured to be coupled to a body of a vehicle wherein the first single enclosure includes a sub-rack measuring less than 13.3 cm in height,
the UWB radio, the first radar, and the first IMU are all enclosed in a second single enclosure, separate from the first single enclosure, that is configured to be coupled to the body of the vehicle,
the processing unit is configured to measure a distance from the vehicle to a landmark using data from the UWB radio, and
the communications radio is configured to perform radio communications with a trackside unit.

10. The PPOS as claimed in claim 9, wherein:
the PPOS is configured to provide a Safety Integrity Level of 0 or 2, and
the first radar is the only radar in the second single enclosure.

11. The PPOS as claimed in claim 10, wherein the first IMU is the only IMU in the second single enclosure.

12. The PPOS as claimed in claim 9, wherein:
the PPOS is configured to provide a Safety Integrity Level of 4,
the PPOS further comprises a second radar, and
the first radar and the second radar are both enclosed in the second single enclosure.

13. The PPOS as claimed in claim 12, wherein:
the PPOS further comprises a second IMU, and
the first IMU and the second IMU are both enclosed in the second single enclosure.

14. A portable positioning and odometry system (PPOS) comprising:
an ultra-wideband (UWB) radio, a radar, and an inertial measurement unit (IMU), all enclosed in a single sensor housing that is configured to be coupled to a body of a vehicle, the vehicle body including a space in a sub-rack measuring less than 3U or 13.3 cm in height, the single sensor housing configured to fit in the space;
a processor housing, separate from the sensor housing, that includes processing circuitry and a communications radio, the processing circuitry operably connected to the UWB radio, the radar, and the IMU; and
a memory in the processor housing and operably connected to the processing circuitry, wherein the memory includes stored instructions that, in response to being executed by the processing circuitry, cause the processing circuitry to:
receive sensor data from the UWB radio, the radar, and the IMU;
determine, using the received sensor data, vehicle position and vehicle odometry data, including measuring a distance from the vehicle to a landmark using data from the UWB radio; and
use the communications radio to perform radio communications with a trackside unit.

15. The PPOS of claim 14, wherein:
the stored instructions further cause the processing circuitry to:
   verify that the vehicle position and the vehicle odometry data are reliable through post installation check out (PICO) tests.

16. The PPOS of claim 14, wherein:
the stored instructions further cause the processing circuitry to:
   execute automatic train protection functions.

17. The PPOS of claim 14, wherein:
the stored instructions further cause the processing circuitry to:
   execute automatic train operation functions.

18. The PPOS of claim 14, wherein:
the communications radio is configured to communicate with one or more positioning devices within a communication-based train control (CBTC) system.

19. The PPOS of claim 14, wherein:
the stored instructions further cause the processing circuitry to:
   perform post installation check out (PICO) tests to verify installation of trackside equipment.

20. The PPOS of claim 14, wherein:
the PPOS is coupled to a vehicle that operates on a track, and
the stored instructions further cause the processing circuitry to:
   perform positioning and odometry functions without the vehicle and the trackside unit being equipped with a communication-based train control (CBTC) system.

* * * * *